United States Patent
Ogawara

(10) Patent No.: US 9,892,119 B2
(45) Date of Patent: Feb. 13, 2018

(54) DISPLAY SYSTEM, DISPLAY DEVICE, AND RECORDING MEDIUM

(71) Applicant: Osamu Ogawara, Kanagawa (JP)

(72) Inventor: Osamu Ogawara, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 241 days.

(21) Appl. No.: 14/333,858

(22) Filed: Jul. 17, 2014

(65) Prior Publication Data

US 2015/0046810 A1 Feb. 12, 2015

(30) Foreign Application Priority Data

Aug. 9, 2013 (JP) .................................. 2013-165826

(51) Int. Cl.
*G06F 3/048* (2013.01)
*G06F 17/30* (2006.01)
(Continued)

(52) U.S. Cl.
CPC ...... *G06F 17/30056* (2013.01); *G06F 3/0482* (2013.01); *G06F 3/04842* (2013.01);
(Continued)

(58) Field of Classification Search
CPC ............. G06F 17/30056; G06F 3/0482; G06F 3/04842; G06F 3/165; G06F 3/04847; H04L 67/10
See application file for complete search history.

(56) References Cited

U.S. PATENT DOCUMENTS 7,844,163 B2 * 11/2010 Wakita .............. G06F 17/30056
386/241
8,928,916 B2 * 1/2015 Takada ............... G06K 15/1885
358/1.1
(Continued)

FOREIGN PATENT DOCUMENTS

CN 1779715 A 5/2006
CN 102681662 A 9/2012
(Continued)

OTHER PUBLICATIONS

U.S. Appl. No. 14/338,983, filed Jul. 23, 2014, Ogawara.
U.S. Appl. No. 14/338,983, filed Jul. 23, 2014.
Combined Chinese Office Action and Search Report dated Sep. 30, 2016 in Patent Application No. 201410557445.X (with English language translation).
(Continued)

*Primary Examiner* — Tuyetlien T Tran
(74) *Attorney, Agent, or Firm* — Oblon, McClelland, Maier & Neustadt, L.L.P.

(57) ABSTRACT

A display system includes a display device and an information terminal able to communicate with the display device, the information terminal including a storage unit storing selected content data, a generation unit generating playback control information based on a number of the selected content data, the playback control information being used for controlling playback of the selected content data and including information indicating a storage location of the selected content data, and a transmission unit transmitting the playback control information to the display device, the display device including a display control unit controlling the playback of the selected content data based on the playback control information by referring to the information indicating the storage location of the selected content data.

10 Claims, 20 Drawing Sheets

(51) Int. Cl.
 *G06F 3/0484* (2013.01)
 *G06F 3/0482* (2013.01)
 *G06F 3/16* (2006.01)
 *H04L 29/08* (2006.01)

(52) U.S. Cl.
 CPC .......... *G06F 3/04847* (2013.01); *G06F 3/165* (2013.01); *H04L 67/10* (2013.01)

(56) References Cited

U.S. PATENT DOCUMENTS

| | | | | |
|---|---|---|---|---|
| 2003/0229900 | A1* | 12/2003 | Reisman | G06F 17/30873 725/87 |
| 2006/0056796 | A1* | 3/2006 | Nishizawa | G11B 27/00 386/240 |
| 2006/0265403 | A1* | 11/2006 | Mercer | G06F 17/30056 |
| 2012/0251081 | A1* | 10/2012 | Kawaguchi | G11B 27/034 386/278 |

FOREIGN PATENT DOCUMENTS

| | | | | |
|---|---|---|---|---|
| EP | 1667154 | A1 * | 6/2006 | ............ G11B 27/00 |
| JP | 2009-284319 | A | 12/2009 | |
| JP | 2012-093895 | | 5/2012 | |
| JP | 2013-003327 | | 1/2013 | |

OTHER PUBLICATIONS

Japanese Office Action dated Jul. 4, 2017 in Japanese Patent Application No. 2013-165826.

\* cited by examiner

FIG.5

| SET ITEM | SETTING RANGE | INITIAL VALUE |
|---|---|---|
| ORDER | — | — |
| TIME | 1-30 SECONDS<br>ONE SECOND RESOLUTION | 5 SECONDS |
| EFFECT | 0: FADE IN<br>1: LEFT PUSH<br>2: RIGHT PUSH<br>3: LEFT WIPE<br>4: RIGHT WIPE<br>5: NONE | FADE IN |

| SET ITEM | SETTING RANGE | DETAIL |
|---|---|---|
| VERSION | VERSION OF FORMAT | 1.0.0 |
| ORDER | PARAMETER OF ORDER OF CONTENT DATA | 0: DESIGNATED<br>1: RANDOM |
| CONTENT LIST | ARRANGE OF DISPLAY SET OF CONTENT DATA IN STORING ORDER (WHEN ORDER:0) | |
| PATH | DETERMINE PLAYBACK FORMAT BASED ON EXTENSION OF STORAGE DESTINATION OF CONTENT DATA | |
| TIME | PARAMETER OF TIME PERIOD IN SWITCHING OF CONTENT DATA | |
| EFFECT | PARAMETER OF EFFECT IN SWITCHING | 0: FADE IN<br>1: LEFT PUSH<br>2: RIGHT PUSH<br>3: LEFT WIPE<br>4: RIGHT WIPE<br>5: NONE<br>6: RANDOM |

```
{
  "version":"1.0.0","order":0,
  "contents_list":[
    {"path":"/QS/Playlist_1/file_1.jpeg","time":15,"effect":1},
    {"path":"/QS/Playlist_1/file_4.jpeg","time":15,"effect":2},
    {"path":"/QS/Playlist_1/file_2.jpeg","time":15,"effect":2},
    {"path":"/QS/Playlist_1/file_11.jpeg","time":5,"effect":2},
    {"path":"/QS/Playlist_1/file_113.jpeg","time":20,"effect":3}]
}
```
⎫
⎬ 332
⎭

FIG.12

```
{
  "version": "1.0.0", "order" : 0,
  "contents_list" : [
    {"path" : "/QS/Playlist_1/file_1.jpeg", "time" : 0, "effect" : 5},
  ]
}
```
⎫332A

FIG.15

```
{
  "version": "1.0.0", "order" : 0,
  "contents_list" : [
    {"path" : "/QS/Playlist_1/file_1.jpeg", "time" : 10, "effect" : 5},
]
}
```
⎫
⎬ 332B
⎭

FIG.19

```
{
  "version" : "1.0.0" , "order" : 0,
  "contents_list" : [
    {"path" : "http://R.co.jp/QS/Playlist_1/file_1.jpeg" , "time" : 0, "effect" : 1},  ⎫
                                                                                       ⎬ 332C
  ]                                                                                    ⎭
}
```

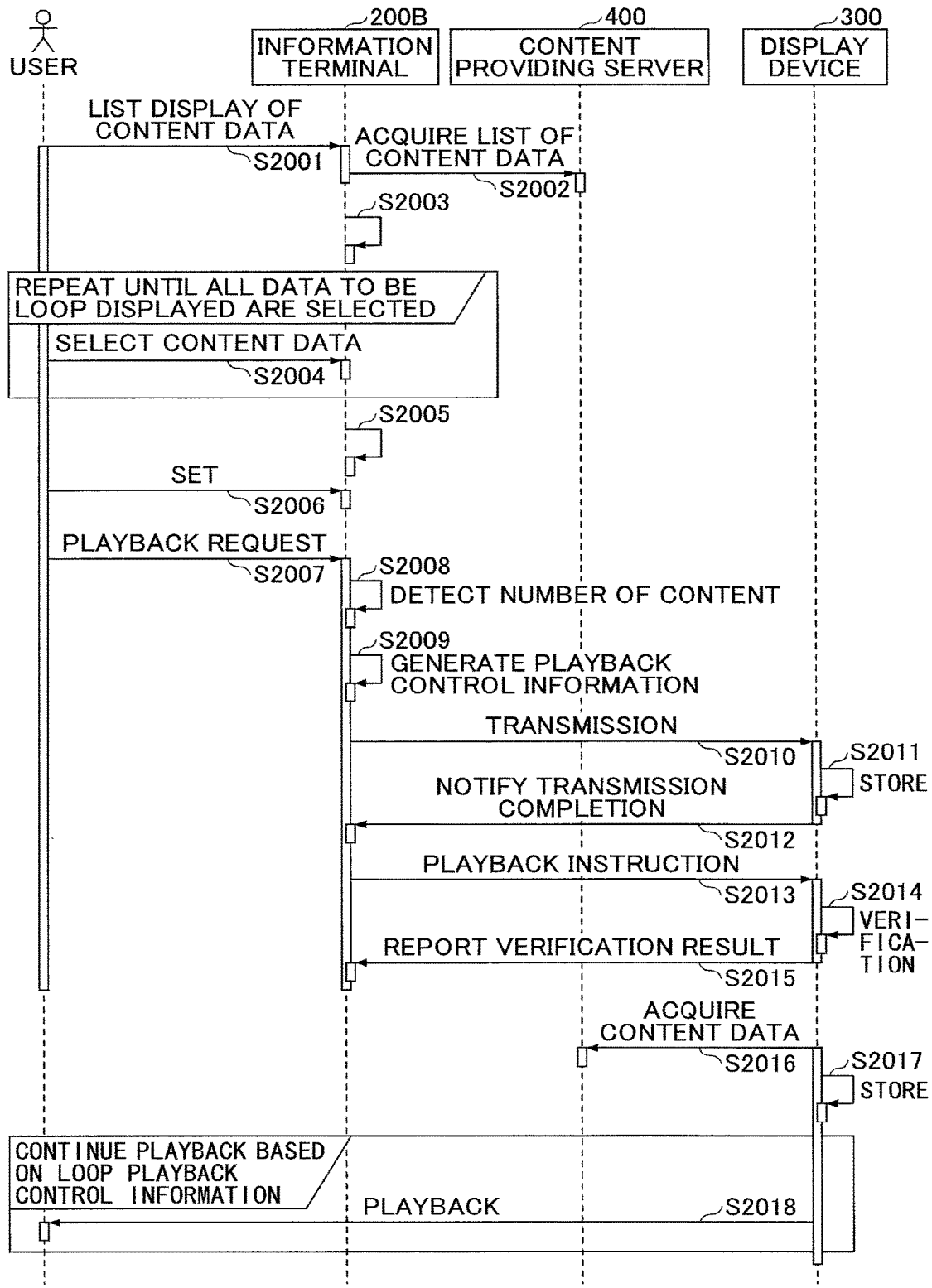

DISPLAY SYSTEM, DISPLAY DEVICE, AND RECORDING MEDIUM

CROSS-REFERENCE TO RELATED APPLICATIONS

The present application is based on and claims the benefit of priority under 35 U.S.C § 119 of Japanese Patent Application No. 2013-165826 filed Aug. 9, 2013, the entire contents of which are hereby incorporated herein by reference.

BACKGROUND OF THE INVENTION

1. Field of the Invention

The present invention generally relates to a display system, an information terminal, a display device, a playback control program, a playback program, a recording medium storing the program and a playback control method of content data.

2. Description of the Related Art

There has been known a technique in which an information terminal provides (transmits) image data to a display device, so that the display device displays the image. In the related technology, previously adjusted values may be set to designate a setting condition for displaying the image. In this regard, there have been provided some techniques to reduce the effort to adjust such values.

For example, Japanese Laid-open Patent Publication No. 2013-003327 discloses a technique in which the information terminal, which transmits image data or the like, transmits display setting information designating a setting condition for displaying an image to the display device so as to cause the display device to designate the setting condition in accordance with the display setting information.

SUMMARY OF THE INVENTION

According to an aspect of the present invention, a display system includes a display device and an information terminal able to communicate with the display device.

Further, the information terminal includes a storage unit storing selected content data, a generation unit generating playback control information based on a number of the selected content data, the playback control information being used for controlling playback of the selected content data and including information indicating a storage location of the selected content data, and a transmission unit transmitting the playback control information to the display device. Further, the display device includes a display control unit controlling the playback of the selected content data based on the playback control information by referring to the information indicating the storage location of the selected content data included in the playback control information transmitted from the transmission unit of the information terminal.

BRIEF DESCRIPTION OF THE DRAWINGS

Other objects, features, and advantages of the present invention will become more apparent from the following description when read in conjunction with the accompanying drawings, in which:

FIG. 5 illustrates example setting information items according to the first embodiment;

FIG. 6 illustrates an example setting table according to the first embodiment;

FIG. 7 illustrates an example of playback control information according to the first embodiment;

FIG. 12 illustrates an example of playback control information according to the second embodiment;

FIG. 15 illustrates an example of playback control information according to the third embodiment;

FIG. 19 illustrates an example of playback control information according to the fourth embodiment; and FIG. 20 is an example sequence diagram of an operation of the display system according to the fourth embodiment.

DETAILED DESCRIPTION OF THE PREFERRED EMBODIMENTS

In a conventional display system, display setting information which designates a setting condition for displaying an image is sent from an information terminal to a display device in the display system. As the display setting information, however, only a value related to a display setting such as display brightness, a color mode, etc., is used.

Due to this, when, for example, content data including a plurality of images are to be displayed on the display device, it is difficult to set the information (condition) related to playback of the content data (image) such as a display order or display time periods of the images into the display device.

The present invention is made in light of the problem and may provide a display system, an information terminal, a display device, a playback control program, a playback program, and a playback control method which are capable of setting information related to the playback of content data into the display device.

According to an embodiment of the present invention, it is possible to set information (data), which is related to the playback of content data, into the display device.

According to an embodiment of the present invention, playback control information is generated indicating how to play back content data based on a value set by a user. Then, the generated playback control information is transmitted to a display device so as to set the information related to the playback of the content data into the display device.

First Embodiment

Figure 1:
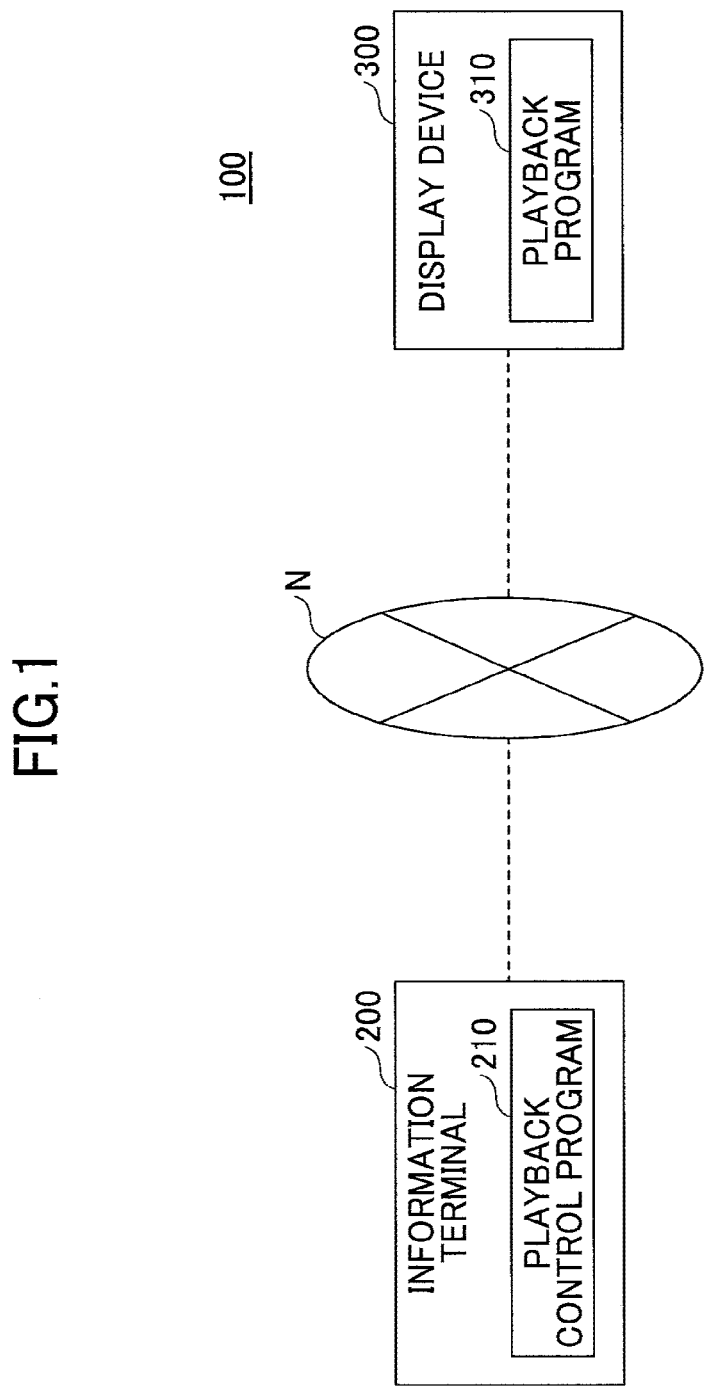
FIG. 1 illustrates an example system configuration of a display system according to a first embodiment.

In the following, a first embodiment of the present invention is described with reference to the accompanying drawings. FIG. 1 illustrates an example system configuration of a display system 100 according to the first embodiment.

The display system 100 in this embodiment includes an information terminal 200 and a display device 300, which are connected to each other via a data transmission path "N" such as a network.

Here, the information terminal 200 in this embodiment may communicate using a communication method in compliance with a standard of 3rd generation (3G), Long Term Evolution (LTE), 4th generation (4G), etc. Further, the information terminal 200 in this embodiment may communicate using a communication method in compliance with ZigBee and Bluetooth (registered trademark).

The information terminal 200 in this embodiment may be, for example, a radio communication terminal such as a smartphone or a cellular phone. Further, the information terminal 200 in this embodiment may be, for example, a tablet Personal Computer (tablet PC) or a laptop PC. It is desired that the information terminal 200 in this embodiment be able to communicate with the display device 300.

The information terminal 200 in this embodiment includes a playback control program 210 installed therein. The information terminal 200 executes the playback control program 210 to generate playback control information of content data to be displayed on the display device 300, and transmits the content data and the playback control information to the display device 300.

The display device 300 in this embodiment includes a playback program 310 installed therein. The display device 300 executes the playback program 310 to display the content data (images) based on the playback control information, the content data and the playback control information having been transmitted from the information terminal 200.

Here, the display device 300 according to this embodiment is desired to have a display function to display the content data based on the playback control information, the content data and the playback control information having been transmitted from the information terminal 200.

In the following in this embodiment, the term (expression) "playback the content data" means that the display device 300 displays the content data based on the playback control information.

Further, the term "content data" refers to, for example, image data or video data. Also, the image data which becomes the content data may be, for example, image data consisting of a single (one piece of) image or image data consisting of a plural number of images. Namely, the content data in this embodiment is desired to be able to be displayed on the display device 300.

In the following description in this embodiment, the content data that are played back by display device 300 are called "playback content data". On the other hand, other content data such as the content data stored in a predetermined memory region are merely called "content data".

Figure 2:
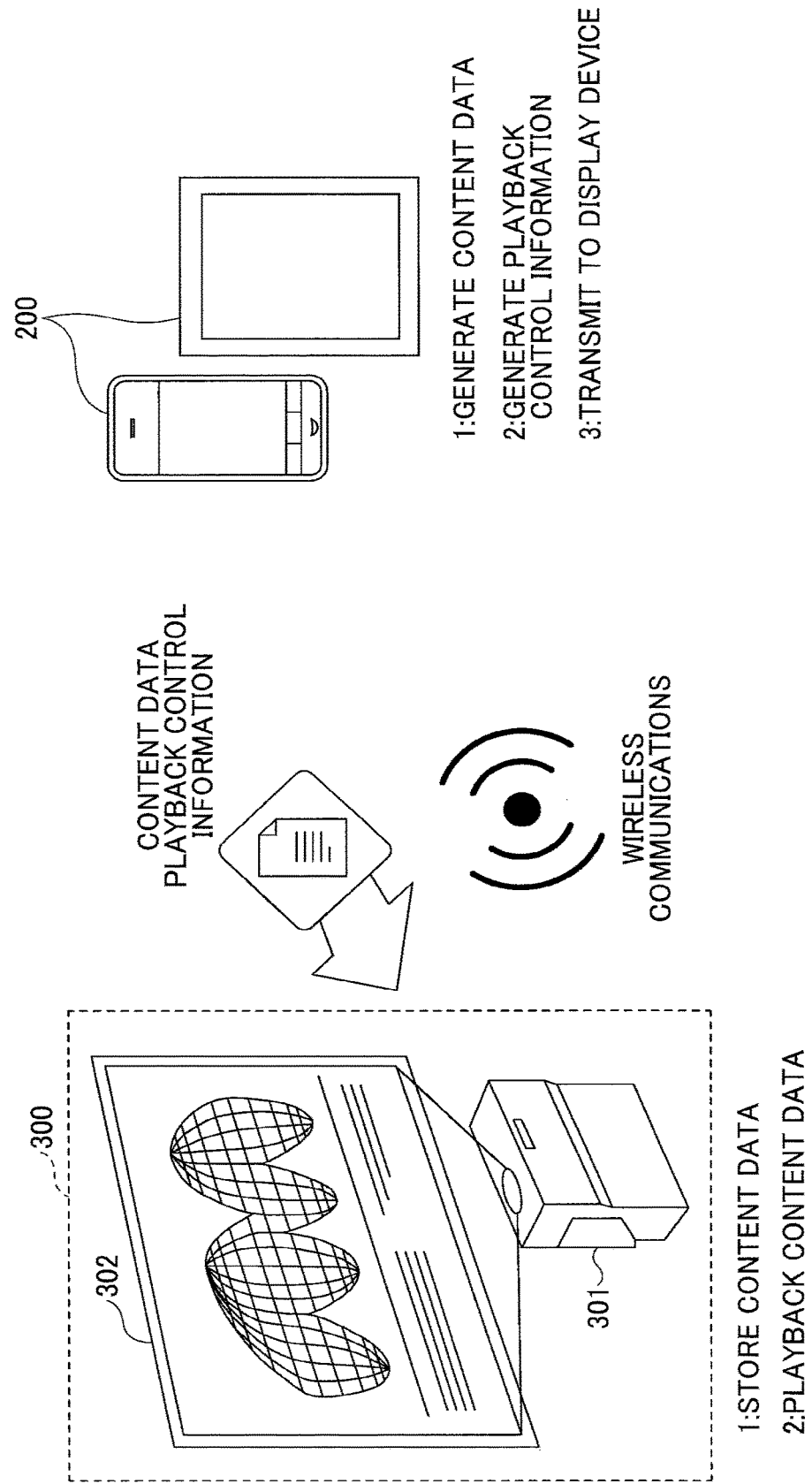
FIG. 2 illustrates an example situation (usage scene) where the display system according to the first embodiment is used.

Next, an example situation (usage scene) of the display system 100 according to this embodiment is described with reference to FIG. 2. FIG. 2 illustrates an example usage scene of the display system 100 according to this embodiment.

In the example of FIG. 2, a smartphone or a tablet PC is used as the information terminal 200, and the display device 300 includes a projector 301 and a screen 302, so that the display system 100 can be used as, for example, Digital Signage.

When the information indicating how the playback content data are to be played back is set by a user, the information terminal 200 in this embodiment generates the playback control information of the playback content data based on the setting. Then, the information terminal 200 transmits the playback content data and the playback control information to the projector 301. The projector 301 stores the received playback content data into a storage section thereof and plays back the playback content data based on the playback control information.

In the display system 100 according to this embodiment, when a user transmits the playback content data and the playback control information to the display device 300 once, it becomes possible to play back the playback content data a number of times (continuously) in accordance with the desired setting.

Namely, when the display system 100 according to this embodiment is applied to the Digital Signage, etc., the content data will be automatically played back based on the user's instructions (settings), so that it becomes possible to reduce a user operation load by skipping the setting of, for example, the display order of the content data whenever the display order is to be changed.

Figure 3:
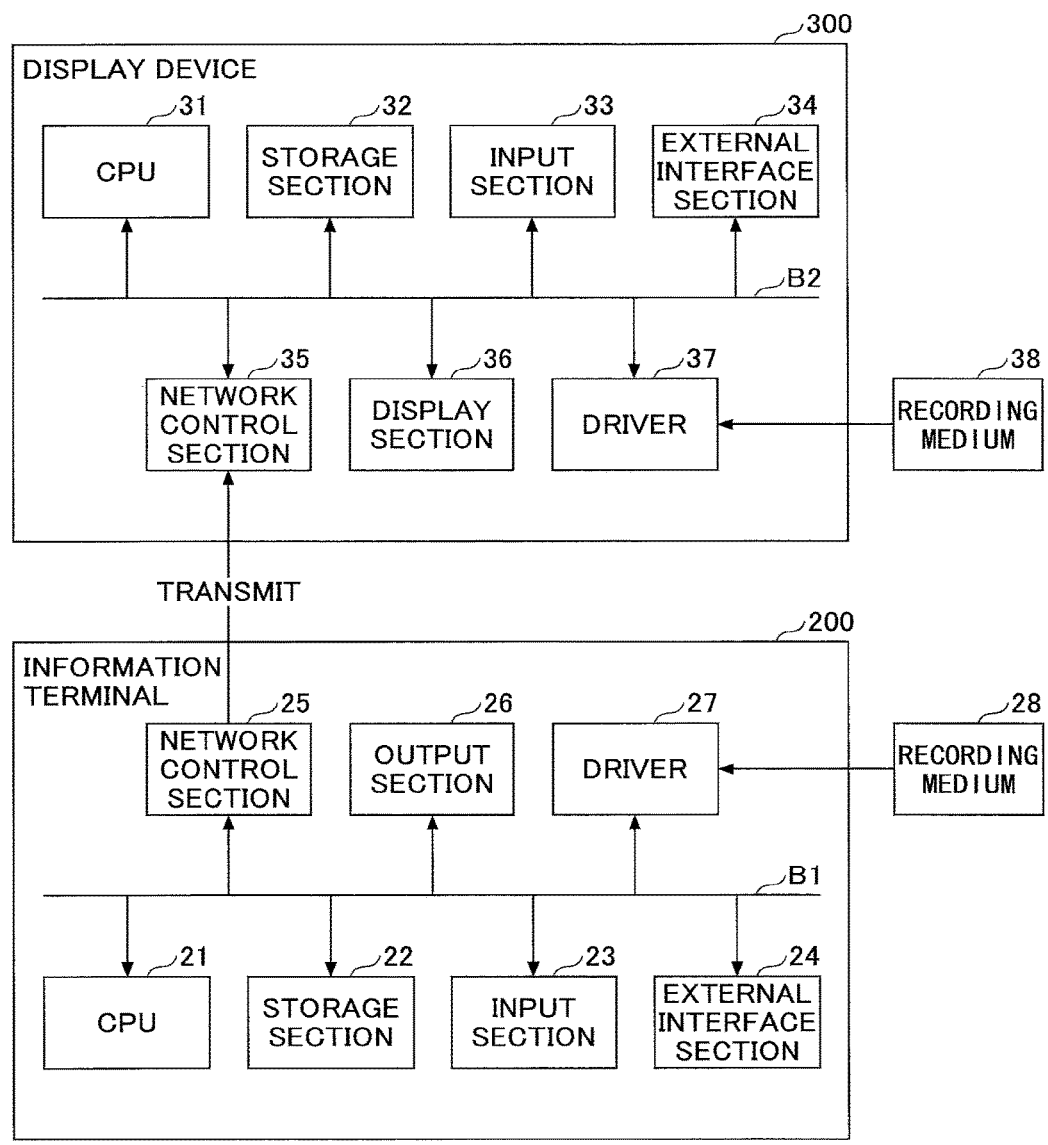
FIG. 3 illustrates an example hardware configuration of apparatuses included in the display system according to the first embodiment.

Next, an example hardware configuration of the devices included in the display system 100 according to this embodiment is described with reference to FIG. 3. FIG. 3 illustrates an example hardware configuration of the devices included in the display system 100 according to this embodiment.

The information terminal 200 in this embodiment includes a Central Processing Unit (CPU) 21, a storage section 22, an input section 23, an external interface section 24, a network control section 25, an output section 26, and a driver 27, which are connected to each other via a bus "B1".

The CPU 21 controls various operations of the information terminal 200. The storage section 22 stores, for example, various information related to the operations and the calculations of the information terminal 200 and various programs to be executed by the information terminal 200. The input section 23 is used to input various signals and information. The input section 23 may have, for example, a display function of a touch panel or the like. Further, the input section 23 may be, for example, a pointing device or a keyboard.

The external interface section 24 in this embodiment may be a Universal Serial Bus (USB) memory slot, Near Field Communication (NFC) or the like. The network control section 25 may be a modem, a LAN card or the like, and is used to connect to a network. The output section 26 is used to output various information from the information terminal 200. The output section 26 in this embodiment may be a display or the like or may be a transmission section to transmit various data to an external device.

The playback control program 210 is at least a part of various programs that control the information terminal 200.

The playback control program 210 may be provided by a distributed recording medium 28, downloading from a network and the like. As the recording medium 28 storing the playback control program 210, a various types of recording media may be used including a recording medium in which information is optically, electronically, or magnetically stored such as a CD-ROM, a flexible disk, a magnetooptical disk or the like and a recording medium in which information is electrically stored such as a semiconductor memory or the like.

Further, when the recording medium 28 in which the playback control program 210 is recorded is set in the driver 27, the playback control program 210 is installed from the recording medium 28 into the storage section 22 via the driver 27. On the other hand, the playback control program 210 which is downloaded via a network is installed into the storage section 22 via the network control section 25.

The storage section 22 stores the playback control program 210 installed therein and necessary files, data and the like. The CPU 21 realizes various processes described below based on the playback control program 210 stored in the storage section 22.

The display device 300 includes a CPU 31, a storage section 32, an input section 33, an external interface section 34, a network control section 35, a display section 36, and a driver 37 which are connected to each other via a bus "B2".

The CPU 31 controls various operations of the display device 300. The storage section 32 stores, for example, various information related to the operations and the calculations of the display device 300, various programs to be executed by the display device 300, and the content data to be played back on the display device 300. The input section 33 is used to input various signals and information. The input section 33 may be, for example, an operation member to operate the display device 300.

The external interface section 34 in this embodiment may be a USB memory slot, NFC or the like. The network control section 35 controls the connection of the display device 300 to a network. The display section 36 displays the content data based on display instructions received by the display device 300.

The playback program 310 in this embodiment is at least a part of the various programs that control the display device 300. The playback control program 310 may be provided by a distributed recording medium 38, downloading from a network and the like.

Further, when the recording medium 38 in which the playback control program 310 is recorded is set in the driver 37, the playback control program 310 is installed from the recording medium 38 into the storage section 33 via the driver 37. On the other hand, the playback control program 310 which is downloaded via a network is installed into the storage section 33 via the network control section 35.

The storage section 33 stores the playback control program 310 installed therein and necessary files, data and the like. The CPU 31 realizes various processes described below based on the playback control program 310 stored in the storage section 33.

Figure 4:
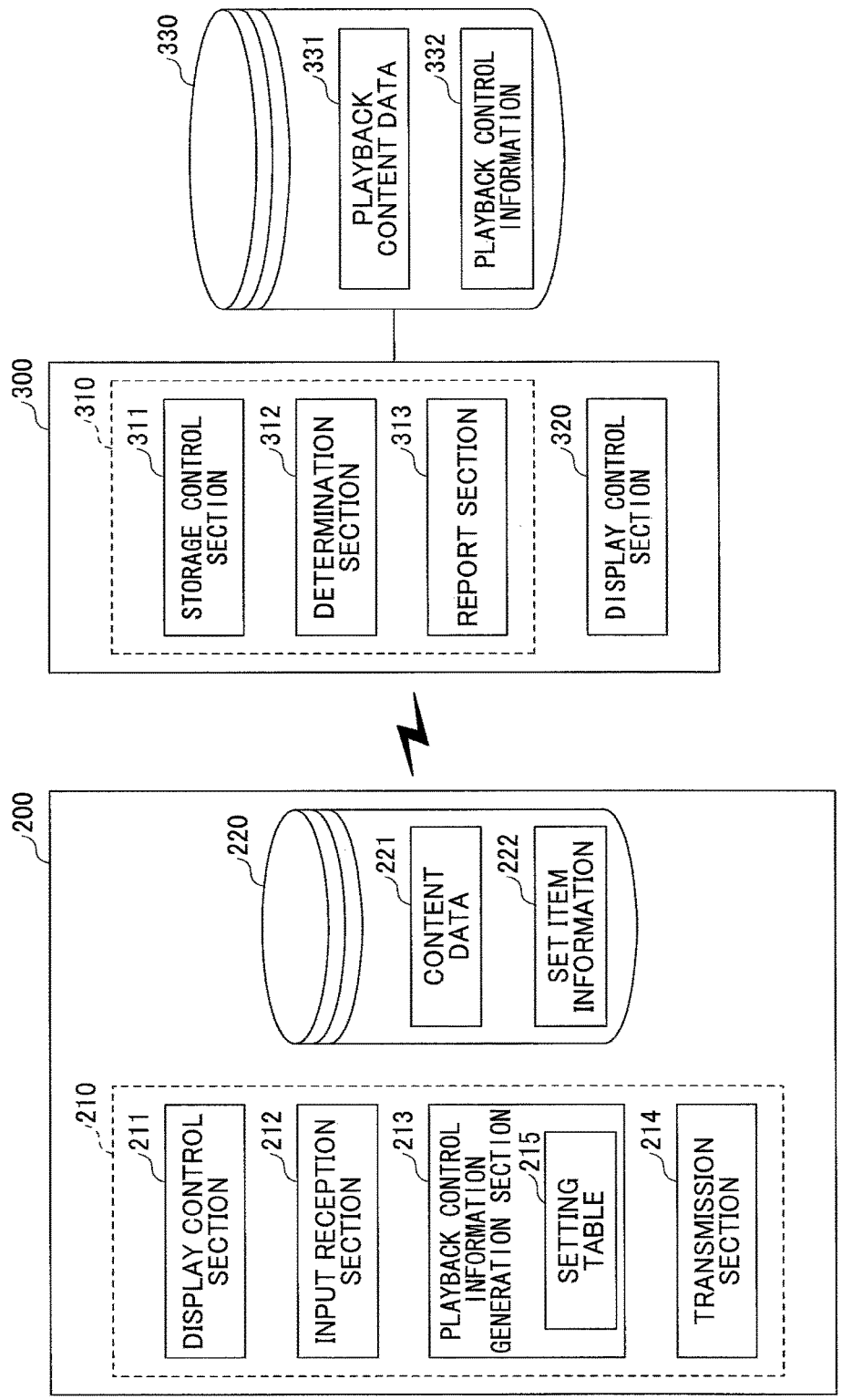
FIG. 4 is an example functional block diagram of the apparatuses included in the display system according to the first embodiment.

Next, an example functional configuration of the devices included in the display system 100 in this embodiment is described with reference to FIG. 4. FIG. 4 illustrates an example functional configuration of the devices in the display system 100 according to the first embodiment.

The information terminal 200 in this embodiment includes a predetermined storage area 220 provided in the storage section 22. The storage area 220 stores, for example, content data 221 and set item information 222. The content data 221 herein refers to the data, such as image data and video data, that can be displayed on the display device 300 or the like. The set item information 222 herein refers to the information indicating the items that are set by a user in the playback control information. Details of the set item information 222 are described below.

Further, the information terminal 200 in this embodiment includes a display control section 211, an input reception section 212, a playback control information generation section 213, and a transmission section 214.

The display control section 211 causes a display or the like which is the output section 26 of the information terminal 200 to display a list screen of the content data 221, a setting screen where values of the items included in the set item information 222 can be set and the like.

The input reception section 212 receives the selection (result) of the content data 221 in the list screen where a list of the content data 221 is displayed. In this embodiment, the content data 221 that are selected in the list screen of the information terminal 200 are transmitted to the display device 300 as the playback content data 331 that are to be played back by the display device 300. Further, the input reception section 212 receives (accepts) an input of setting values in the setting screen where the values of the items included in the set item information 222 are to be set.

The playback control information generation section 213 generates the playback control information 332 based on the information included in the playback content data 331. Specifically, the playback control information generation section 213 in this embodiment includes (stores) a setting table 215 where the items included in the playback control information 332 are associated with the respective values set for the items, so that the playback control information generation section 213 refers to the setting table 215 and generates the playback control information 332 in a predetermined format.

In this embodiment, the items included in the set item information 222 are a part of the items included in the playback control information 332. Namely, the playback control information 332 in this embodiment includes the values, set by a user, relative to the items included in the set item information 222. A detailed process of the playback control information generation section 213 is described below.

The transmission section 214 transmits the playback content data 331 and the generated playback control information 332 to the display device 300.

In this embodiment, a case is described where the content data 221 are stored in the storage section 22 of the information terminal 200. However, the present invention is not limited to this configuration. The content data 221 may be stored in, for example, a portable recording medium so that the content data 221 stored therein can be read by the information terminal 200 or an external device that can communicate with the information terminal 200.

The display device 300 in this embodiment includes a storage control section 311, a determination section 312, and a report section 313. The display device 300 in this embodiment further includes a display control section 320 that controls the display of the display section 36.

The display device 300 includes a storage area 330 in which the playback content data 331 and the playback control information 332, which are transmitted from the information terminal 200, are stored. Here, the storage area 330 may be provided in the storage section 32 of the display device 300 or in the a portable recording medium so that the data stored therein can be read by the display device 300.

Further, the storage area 330 may be provided in an external device that can communicate with the display device 300.

The storage control section 311 in this embodiment stores the playback content data 331 and the playback control information 332, which are received from the information terminal 200, into the storage area 330. Further, upon receiving a playback instruction to play back the playback content data 331 from the information terminal 200, the storage control section 311 sets the value of the items included in the playback control information 332 into the display device 300.

The determination section 312 determines (verifies) whether the playback content data 331 can be played back by the display device 300 based on the playback control information 332. A detailed process of the determination section 312 is described below. The report section 313 reports the determination result by the determination section 312 to the information terminal 200.

In the following, the generation of the playback control information 332 by the playback control information generation section 213 in this embodiment is described.

FIG. 5 illustrates an example of the set item information 222 according to this embodiment.

The set item information 222 in this embodiment includes, for example, "Order", "Time", and "Effect" as the set items.

The set item "Order" indicates a generation order of the content data 221 included in the playback content data 331. In this embodiment, when, for example, the value of the set item "Order" is zero, this indicates that the playback order of the content data 221 included in the playback content data 331 is designated.

On the other hand, when, for example, the value of the set item "Order" is one, this indicates that the playback order of the content data 221 included in the playback content data 331 is random. The playback order of the content data 221 may be determined based on, for example, the selection order of the content data 221 as the playback content data 331 in the list screen of the content data 221.

The set item "Time" indicates a playback time period when the content data 221 included in the playback content data 331 are played back.

The set item "Effect" indicates a display switching method (manner) of changing the display of the content data 221 included in the playback content data 331 from one to another.

In the information terminal 200 in this embodiment, the display control section 211 controls so as to display setting screens of the set items based on the set item information 222. Details of the setting screens are described below.

In the following, a case is described where three content data 221a, 221b, and 221c are selected in this order from the content data 221 stored in the storage area 220 of the information terminal 200.

In this case, the playback content data 331 are a set of the content data 221a, 221b, and 221c. Therefore, when the value of the set item "Order" is zero, the content data 221a, 221b, and 221c are played back in this order. On the other hand, when the value of the set item "Order" is one, the content data 221a, 221b, and 221c are played back in random order. In this embodiment, the value of the set item "Order" may be set to zero as the initial value.

As the content (data) of the set item "Time", the playback time periods to play back the content data 221a, 221b, and 221c are set. As the initial value of the set item "Time", five seconds are set in advance.

In the set item "Effect", for example, in the case where the content data 221a, 221b, and 221c are set (selected) to be played back in this order, a display switching method (manner) in the display of the display device 300 from the content data 221a to the content data 221b is set. Further, in the set item "Effect", a display switching method (manner) of the display device 300 from the content data 221b to the content data 221c is set.

Further, as the initial value of the set item "Effect", "fade in" is selected. The "fade in" refers to a display switching method in which the image to be played back becomes gradually clear.

In this embodiment, as the display switching methods, push to the left, push to the right, wipe, etc., can be set. Here, the term "push to the left/right" refers to a display switching method in which the next content data are displayed in a manner such that the currently displayed image is pushed out to the left/right side.

Further, the term "wipe" to the left/right" refers to a display switching method in which the next content data are displayed in a manner such that the currently displayed image is wiped out to the left/right side.

In this embodiment, the values may be set as the set item included in the set item information 222 so as to be collectively applied to the content data 221 included in the playback content data 331. Otherwise, the values of the set items may be set as content data 221 included in the playback content data 331.

FIG. 6 illustrates an example setting table 215 according to the first embodiment. The set items in the setting table 215 in this embodiment includes not only "Order", "Time", and "Effect" in the set item information 222 but also "Version", "Content list", and "Path".

The set item "Version" indicates the version of the format when the playback control information 332 is generated. In this embodiment, it is assumed that the value of the set item "Version" corresponds to the value of the display device 300 to make sure that the playback content data 331 can be displayed by the display device 300.

The set item "Content list" indicates an array of the playback settings of the content data 221. The term "array" herein refers to, for example, a stored order of the content data 221 included in the playback content data 331 into the storage area 330, a selected order of the content data 221 or the like. In the setting table 215 in this embodiment, it is assumed that the set items "Version" and "Content list" are set in advance.

The set item "Path" indicates the location where the content data 221 included in the playback content data 331 are stored. In this embodiment, when the content data 221 are selected, the location where the content data 221 are stored may be set in the setting table 215 as the value of the set item "Path". Further, the value of the set item "Path" may further include the file name of the selected content data 221.

When the values of the set items included in the set item information 222 are set by a user, the playback control information generation section 213 in this embodiment associates the values set by the user with the corresponding set items in the setting table 215. Then, the playback control information generation section 213 refers to the setting table 215 and generates the playback control information 332.

In this embodiment, a case is described where some of the set items included in the setting table 215 are included in the set item information 222. However, the present invention is not limited to this configuration. For example, all the set items included in the setting table 215 may be included in the set item information 222. In other words, each of the set items included in the setting table 215 may be or may not be included in the set item information 222 depending on user's selection.

FIG. 7 illustrates an example of the playback control information 332 according to the first embodiment. When the values of the set items in the setting table 21 are set, the playback control information generation section 213 generates the playback control information 332 including all the values of the set items in a predetermined format.

In the example of FIG. 7, the predetermined format is a JavaScript Object Notation (JSON) format. The JSON format refers to a lightweight data description language based on the objet description method of JavaScript (registered trademark). Here, it is assumed that the format of the playback control information 332 in this embodiment is readable by the display device 300.

In the example of FIG. 7, the value of the set item "Version" is "1.1.0", and the value of the set item "Order" is "0". Further, as the values of the set item "Content list", five content data 221 included in the playback content data 331 are arranged in the playback order. Specifically, the values of the set item "Content list" are the values of the set items "Path", the values of the set items "Time", and the values of the set items "Effect" of the five content data 221 included in the playback content data 331.

As described above, according to this embodiment, the playback control information 332 including the values set by a user is generated and transmitted to the display device 300. By doing this, in this embodiment, it becomes possible to set the user's desired playback method to the display device 300.

Here, it should be noted that FIG. 7 illustrates one example of the playback control information 332 in this embodiment only. Namely, the playback control information 332 in the present invention is not limited to the example of FIG. 7. The playback control information 332 according to an embodiment is desired to include at least the information indicating the location where the content data 221 included in the playback content data 331 are stored.

Figure 8:
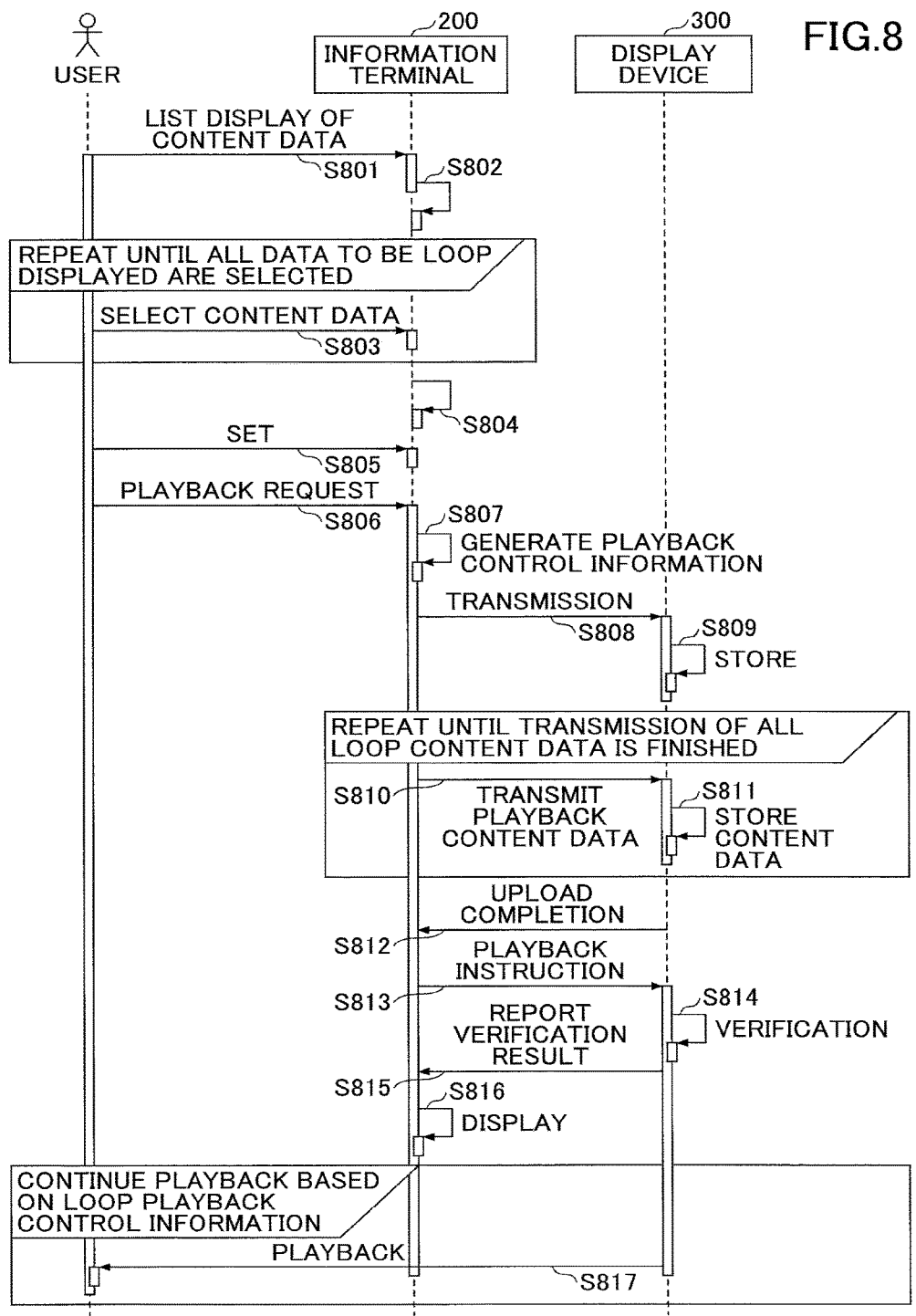
FIG. 8 is an example sequence diagram of an operation of the display system according to the first embodiment.

Next, an example operation of the display system 100 according to this embodiment is described with reference to FIG. 8. FIG. 8 is a sequence diagram of an example operation of the display system 100 according to the first embodiment.

In the display system 100 according to this embodiment, when a user requests the information terminal 200 to display a list of the content data 221 (step S801), the display control section 211 of the information terminal 200 controls to display a list screen of the content data 221 (step S802). Details of the list screen are described below.

Next, the input reception section 212 of the information terminal 200 receives (accepts) the selection of the content data 221 on the list screen (step S803). The information terminal 200 repeats the process in step S803 until the user finishes the selection of the content data 221. A set of the content data 221 selected in step S803 becomes the playback content data 331.

Next, the display control section 211 of the information terminal 200 refers to the set item information 222 and controls to display a setting screen to set the set items included in the set item information 222 (step S804). Details of the setting screen are described below.

Next, the input reception section 212 of the information terminal 200 receives (accepts) the values of the set items that are input through the setting screen (step S805). The input values of the set items are stored in association with the corresponding set items into the setting table 215. The set items included in the set item information 222 are described above.

Next, upon receiving a playback request to play back the playback content data 331 from a user (step S806), the playback control information generation section 213 of the information terminal 200 generates the playback control information 332 (step S807).

Specifically, upon the receipt of the playback request, the playback control information generation section 213 in this embodiment generates the playback control information 332 by assigning the values of the set items stored in the setting table 215 into the corresponding parts in the predetermined format.

Next, the transmission section 214 of the information terminal 200 transmits the generated playback control information 332 to the display device 300 (step S808).

Upon receiving the playback control information 332 from the information terminal 200, the storage control section 311 of the display device 300 controls to store the playback control information 332 into the storage area 330 (step S809).

Next, the transmission section 214 of the information terminal 200 transmits the playback content data 331 to the display device 300 (step S810). The storage control section 311 of the display device 300 controls to store the playback content data 331 into the storage area 330 (step S811).

In this embodiment, a folder or the like corresponding to the information terminal 200 is provided (generated) in, for example, the storage area 330. In this case, the playback content data 331 and the playback control information 332 may be stored in the folder.

Next, the report section 313 of the display device 300 notifies the information terminal 200 of the completion of the storage (uploading) of the playback content data 331 into the storage area 330 (step S812).

Upon receiving the notification (report), the information terminal 200 transmits a playback instruction to play back the playback content data 331 to the display device 300 (step S813). Upon receiving the playback instruction from the information terminal 200, the display device 300 sets the values of the set items included in the playback control information 332 to the display device 300 so that the playback content data 331 can be played back based on the playback control information 332.

Further, upon receiving the playback instruction, the determination section 312 of the display device 300 determines whether the playback content data 331 can be played back based on the playback control information 332 (step S814).

In the following, the determination (verification) by the determination section 312 is described. The determination section 312 in this embodiment refers to the playback control information 332 and determines whether the format of the playback control information 332 is readable by the display device 300.

Further, the determination section 312 refers to the playback control information 332 and determines, for example, whether the value of the set item "Version" corresponds to the display device 300 and whether the playback control information 332 includes the values of the set item "Path" of all the content data 221.

The report section 313 in this embodiment notifies the information terminal 200 of the determination results by the determination section 312 (step S815). Specifically, when, for example, the determination section 312 determines that the playback content data 331 can be played back, the report section 313 may notify the information terminal 200 of the successful communications. Upon the receipt of the notification (report) from the report section 313, the information terminal 200 displays the result of the notification (report) (step S816).

On the other hand, when, for example, the determination section 312 determines that the playback content data 331 cannot be played back, the report section 313 may notify the information terminal 200 of a communication failure.

A case where the playback content data 331 cannot be played back refers to, for example, a cases where the format of the playback control information 332 cannot be read by the display device 300, a case where the value of the set item "Version" does not correspond to the display device 300, a case where the playback control information 332 does not include the values of the set item "Path" of all the content data 221, and the like.

In this embodiment, in the case of, for example, the communication failure, a message prompting the retransmission of the playback content data 331 may be displayed on the information terminal 200. In the retransmission of the playback content data 331, the information terminal 200 may repeat the processes in steps S804 through S808.

Further, in the retransmission of the playback content data 331, the information terminal 200 may transmit the playback content data 331 and only the values of the set items included in the set item information 222 to the display device 300. In this case, the display device 300 may store the retransmitted values of the set items into the corresponding items of the playback control information 332 for further determination by the determination section 312.

After step S816, the display device 300 plays back the playback content data 331 based on the playback control information 332 (step S817).

In the example of FIG. 8, a case is described where the information terminal 200 transmits the playback content data 331 to the display device 300 after transmitting the playback control information 332 to the display device 300. However, the present invention is not limited to this procedure.

For example, the information terminal 200 may associate the playback content data 331 with the playback control information 332 and transmit the playback content data 331 in association with the playback control information 332 at the same time to the display device 300.

Further, in the example of FIG. 8, a case is described where the playback control information 332 is generated after the content data 221 are selected on the list screen and the values of the set items in the set item information 222 are set.

However, the present invention is not limited to this procedure. For example, the information terminal 200 may generate the playback control information 332 in parallel with the selection of the content data 221 and the setting of the values of the set items in the set item information 222.

Further, for example, the setting of the values of the set items in the set item information 222 may be done when the playback control program 210 is started up or right after the receipt of the request for displaying the list of the content data 221. The setting of the values of the set items in the set item information 222 is desired to be done before the playback control information 332 is generated.

Figure 9:
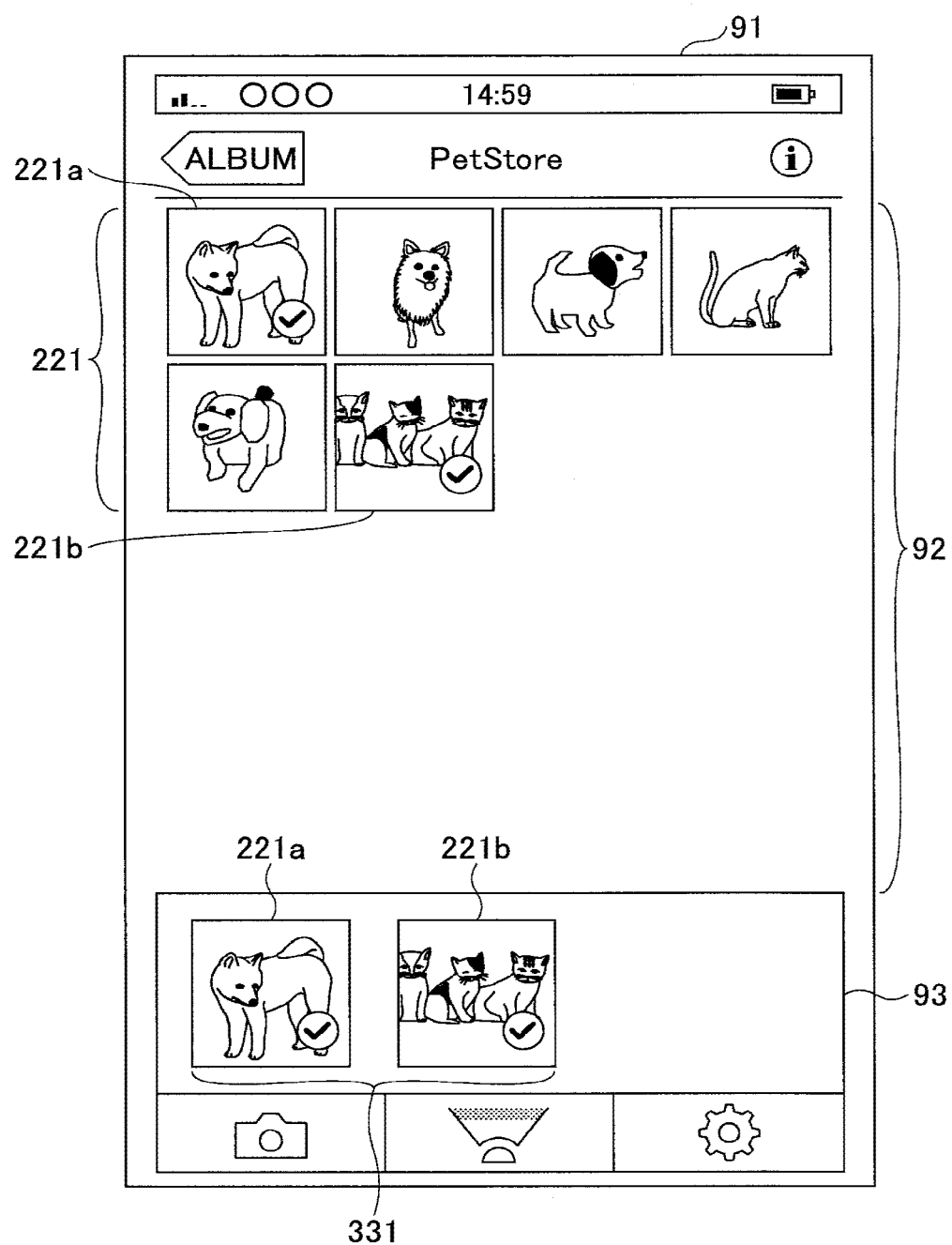
FIG. 9 illustrates an example list screen of content data displayed on an information terminal according to the first embodiment.

In the following, example screens displayed on the information terminal 200 are described with reference to FIGS. 9 and 10. FIG. 9 illustrates an example of a list screen of the content data 221 displayed on the information terminal 200.

A list screen 91 of the content data 221 includes a display area 92 where a list of the content data 221 stored in the storage area 220 and a display area 93 where the playback content data 331 selected in the display area 92 are displayed. Here, the display area 92 may display a thumbnail list of the content data 221. Similarly, the display area 92 may display a thumbnail list of the content data 221 (playback content data 331) selected in the display area 92.

In the example of FIG. 9, the content data 221a and 221b are selected from the list of the content data 221 displayed in the display area 92 of the list screen 91. The selected content data 221a and 221b are displayed in the display area 93 as the playback content data 331. In this case, for example, a check mark or the like indicating that the content data 221 are selected may be superimposed on the thumbnail images of the selected content data 221.

In this embodiment, the content data 221 are sequentially played back in the order of being displayed in the display area 93. Namely, in the playback content data 331 in FIG. 9, the content data 221a and 221b are sequentially played back in this order.

The display order of the content data 221 in the display area 93 may be based on the selection order of the content data 221 in the display area 92. Here, it is assumed that the arranging order of the content data 221 may be arbitrarily changed by a user.

Figure 10:
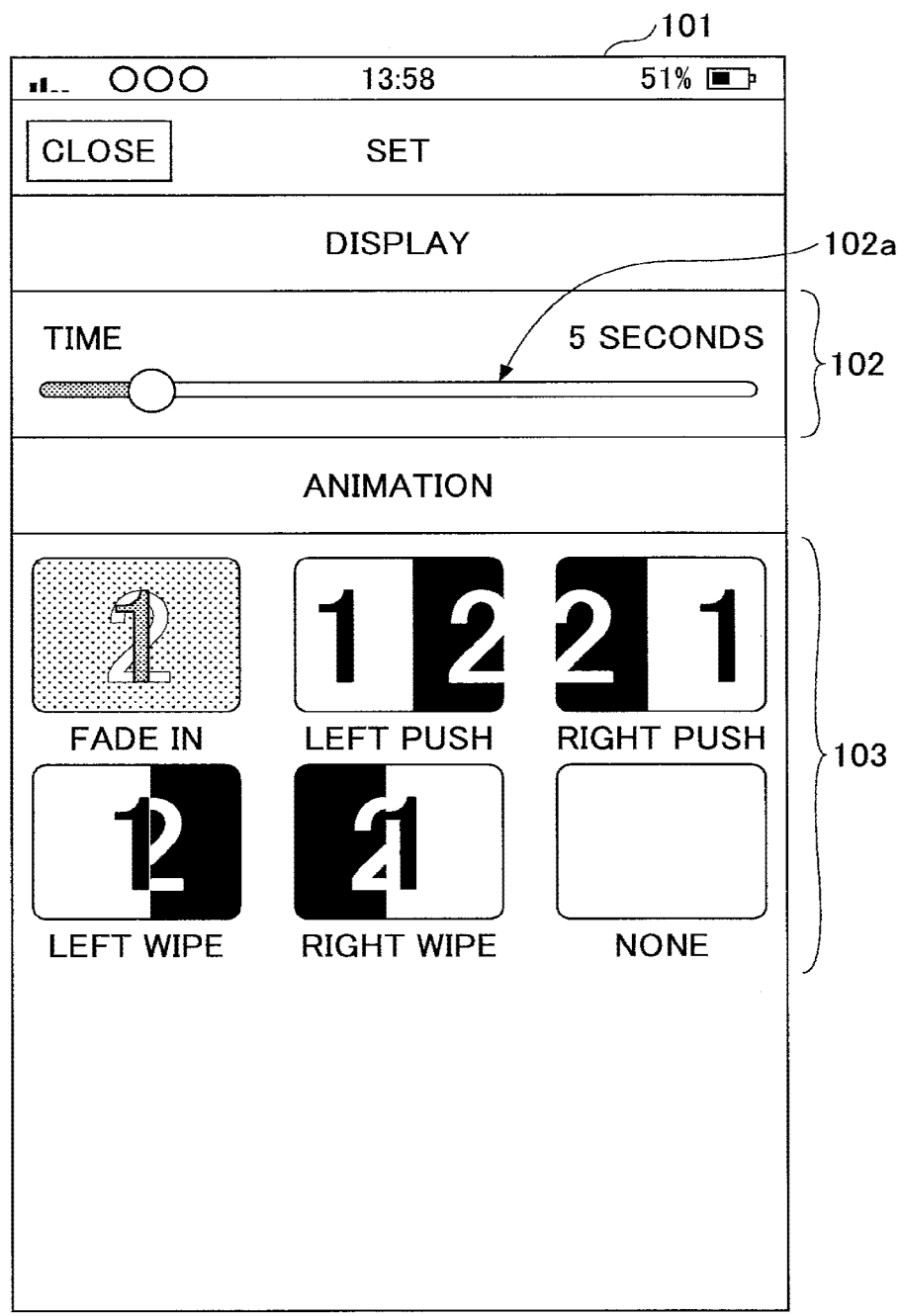
FIG. 10 illustrates an example setting screen displayed on the information terminal according to the first embodiment.

FIG. 10 illustrates an example setting screen displayed on the information terminal 200 according to the first embodiment. A setting screen 101 in FIG. 10 includes a display area 102 where a value of the set item "Time" in the set item information 222 can be set and a display area 103 where a value of the set item "Effect" in the set item information 222 can be set.

In the example of FIG. 10, as the user interface to set the value of the set item "Time", a slider 102a is used. Further, in the example of FIG. 10, as the user interface to set the value of the set item "Effect", animation icons are used which indicate the respective switching methods of switching the content data 221 corresponding to the respective set values.

In this embodiment, as described above, the visually recognizable user interfaces are used to set the values of the set items. Therefore, it becomes easier for a user to set those values.

As described above, in the display system 100 according to this embodiment, the information terminal 200 transmits the playback content data 331 including the content data 221 selected by a user and the playback control information 332 including the values of the set items selected by the user to the display device 300.

Then, the display device 300 sets the information related to the playback of the playback content data 331 based on the playback control information 332 received from the information terminal 200, and plays back the playback content data 331 in accordance with the playback control information 332.

Conclusively, according to this embodiment, it becomes possible to set the information related to the playback of the content data 221 in the display device 300 in accordance with user's expectation (intention).

Second Embodiment

A second embodiment of the present invention is descried with reference to the accompanying drawings. The second embodiment of the present invention differs from the first embodiment in that the playback control information is generated in accordance with whether the number of the selected content data is one or more than one. Therefore, in the following, only the difference from the first embodiment is described and the same reference numerals are repeatedly used to describe the same or equivalent elements described in the first embodiment and the repeated descriptions thereof may be omitted.

Figure 11:
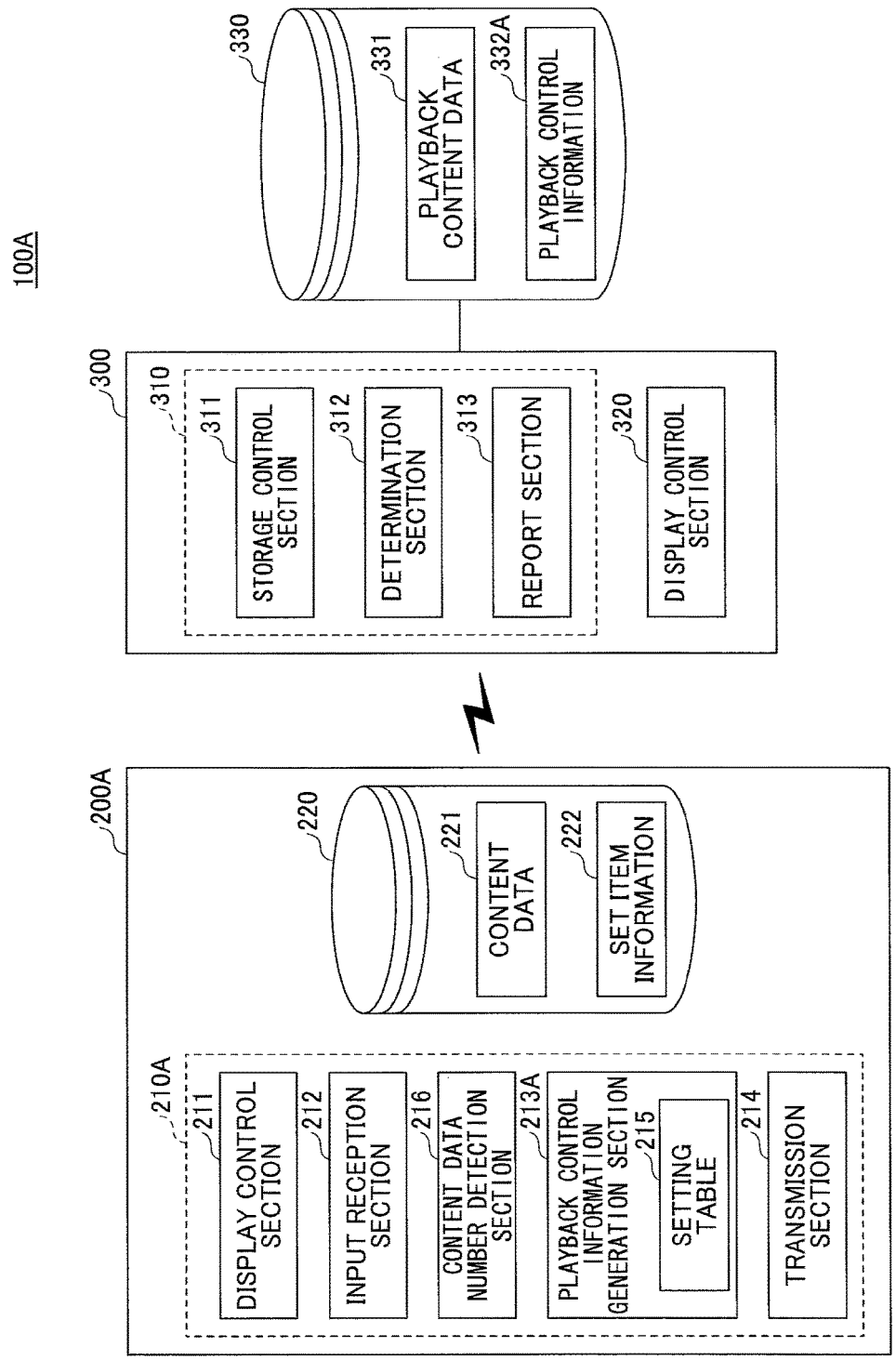
FIG. 11 is an example functional block diagram of apparatuses included in a display system according to a second embodiment.

FIG. 11 illustrates an example functional configuration of the devices in a display system 100A according to the second embodiment.

The display system 100A in this embodiment includes an information terminal 200A and the display device 300.

The information terminal 200A includes a playback control program 210A installed therein. The information terminal 200A in this embodiment includes the display control section 211, the input reception section 212, a playback control information generation section 213A, the transmission section 214, and a content data number detection section 216.

The content data number detection section 216 detects the number of the content data 221 that are included in the playback content data 331 and selected in the list screen of the content data 221.

When the content data number detection section 216 detects that the number of the content data 221 is more than one (two or more), the playback control information generation section 213A in this embodiment generates the playback control information 332 which is similar to that in the first embodiment.

On the other hand, when the content data number detection section 216 detects that the number of the content data 221 is one, the playback control information generation section 213A generates playback control information 332A corresponding to the case where the playback content data 331 includes one content data 221 (i.e., the case where the number of the playback content data 331 is one).

Specifically, when the number of the detected content data 221 is one, the playback control information generation section 213A generates the playback control information 332A where an invalid value is set as the set item related to the switching method of switching the display of the content data 221 in the display device 300.

In this regard, for example, a case is described where the playback content data 331 corresponds to data of a single image.

In this case, the display device 300 plays back the image data based on the playback time period included in the playback control information 332A, and terminates the playback process when the playback time period has elapsed. Now, it is thought that the display device 300 may play back the image data again in accordance with an instruction to repeat playback. In this case, however, as a result, due to the repeated playback and stop of the same image data by the display device 300, the displayed image (screen) may have a flicker.

To avoid this problem, in the case where, for example, the playback content data 331 consists of only one content data 221, it is thought to prompt a user to further set the playback control information 332A to prevent the display (screen) from being switched.

In this embodiment, by disabling the value of the set item related to the switching of the display of the playback control information 332A, it becomes possible to continue the playback of the desired content data 221 without unnecessary switching of the display of the content data 221 in the playback of the playback content data 331.

Further, in this embodiment, the value of the set item related to the switching of the display is set as invalid based on the detected number of content data 221 included in the playback content data 331. Therefore, it is not necessary for a user to change the setting, thereby improving the operability of the display system 100.

In the following, the playback control information 332A according to this embodiment is described with reference to FIG. 12. FIG. 12 illustrates an example of the playback control information 332A according to the second embodiment.

The playback control information 332A of FIG. 12 is generated when "file_1.jpeg" is selected as the playback content data 331 in the list screen of the content data 221.

In the playback control information 332A, the set item related to the switching of the display of the content data 221 refers to, for example, the set items "Time" and "Effect". In this case, the playback control information generation section 213A in this embodiment set the value of the set item "Time" to "0". The set item "Time" is the parameter of the time period of the switching display of the content data 221.

Therefore, by setting this value to "0", the display of the content data 221 is no longer changed (switched). Namely, by setting the value of the set item "Time" to "0", the value of the set item "Time" becomes invalid.

In the example of FIG. 12, a case is described where a value (i.e., "0") is set as the value of the set item "Time". However, the present invention is not limited to this setting. For example, the value "∞ (infinity)" may be set as the value of the set item "Time". Otherwise, for example, such an invalid value may be set as the value of the set item "Effect" in addition to (or but not to) the value of the set item "Time".

In this embodiment, as the method of setting the value of the set item "Effect" to be invalid, for example, no value is set as the value of the set item "Effect" or a value indicating "No Effect" is set as the value of the set item "Effect" (see FIG. 6).

Further, in this embodiment, for example, both the value of the set item "Time" and the value of the set item "Effect" may be set as invalid. Otherwise, for example, only the value of the set item "Time" may be set as invalid.

Figure 13:
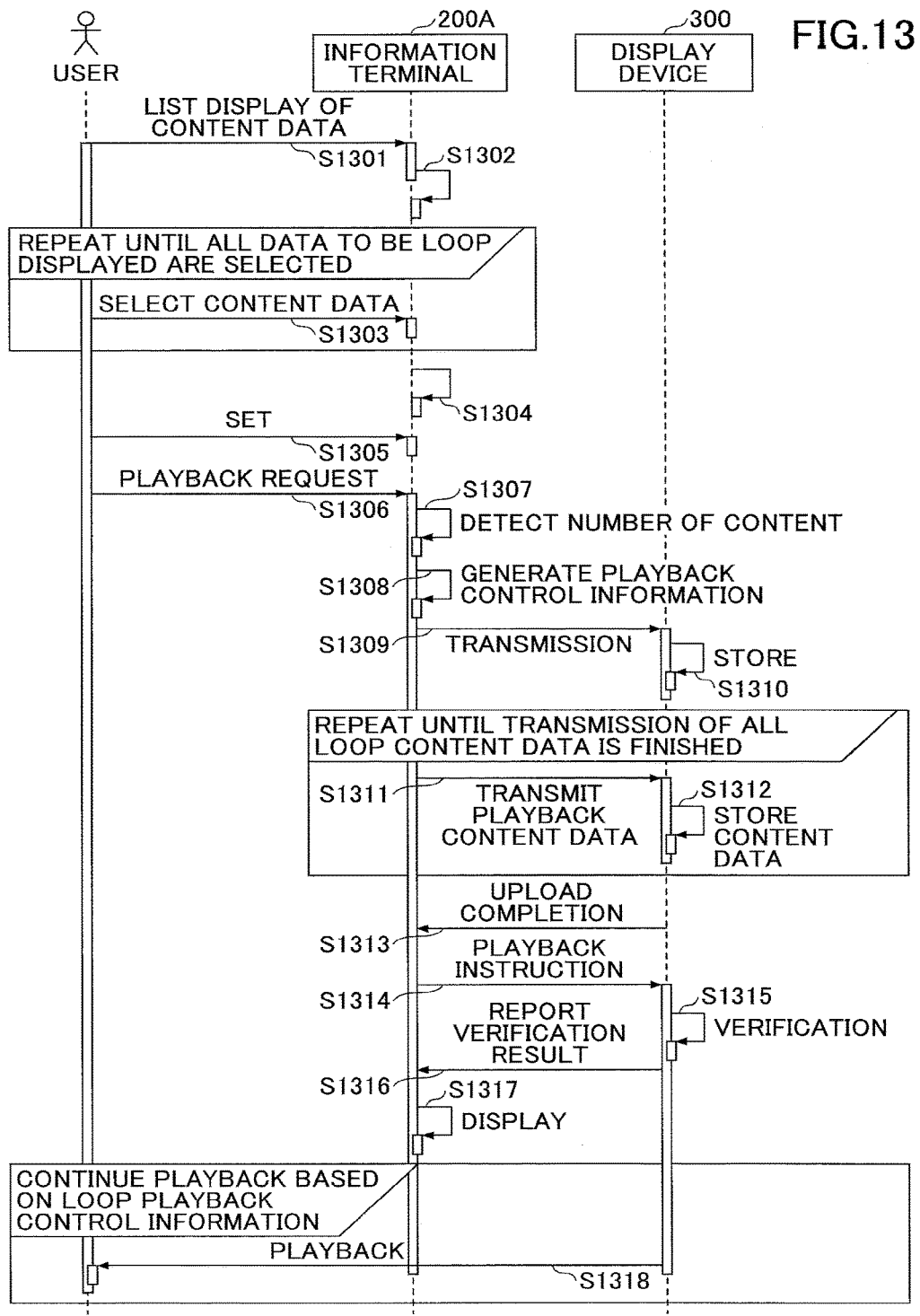
FIG. 13 is an example sequence diagram of an operation of the display system according to the second embodiment.

In the following, an example operation of the display system 100A is described with reference to FIG. 13. FIG. 13 is a sequence diagram of an example operation of the display system 100A according to the second embodiment.

Here, the processes in steps S1301 through S1306 in FIG. 13 are the same as those in steps S801 through S806 in FIG. 8. Therefore, the repeated descriptions thereof are herein omitted.

Upon receiving the playback request in step S1306, the content data number detection section 216 of the information terminal 200A detects the number of the content data 221 selected in step S1303 (step S1307).

Next, the playback control information generation section 213A generates the playback control information 332 in accordance the number of the content data 221 detected in step S1307 (step S1308). More specifically, when the detected number of the content data 221 is more than one, in other words, when the detected number of the content data 221 included in the playback content data 331 is more than one, the playback control information generation section 213A generates the playback control information 332 in the same manner as that in the first embodiment.

On the other hand, when the detected number of the content data 221 is one, in other words, when the detected number of the content data 221 included in the playback content data 331 is one, the playback control information generation section 213A generates the playback control information 332A in which the value of the set item related to the switching of the display is set to invalid.

Here, the processes in steps S1309 through S1318 in FIG. 13 are the same as those in steps S809 through S8018 in FIG. 8. Therefore, the repeated descriptions thereof are herein omitted.

Further, in the example of FIG. 13, a case is described where the value of the set item included in the set item information 222 is set in step S1304 before the playback control information 332 is generated in step S1308. However, it should be noted that the present invention is not limited to this procedure.

For example, the value of the set item included in the set item information 222 may be set in the setting screen 101 after the number of the content data 221 in the playback content data 331 is detected in step S1307.

When the detected number of the content data 221 in the playback content data 331 is one, the display control section 211 in this embodiment may not display the slider 102a (see FIG. 10) for setting the value of the set item "Time" in the setting screen 101. Otherwise, for example, the display control section 211 displays the slider 102a in a manner that the slider 102a cannot be operated.

In the same manner, the display control section 211 may not display the animation icons 103 (see FIG. 10) for setting the value of the set item "Effect" in the setting screen 101. Otherwise, for example, the display control section 211 displays the animation icons 103 in a manner that the animation icons 103 cannot be operated (selected).

As described above, in this embodiment, when the detected number of the content data 221 selected as the playback content data 331 is one, the playback control information 332A in which the value of the set item related to the switching of the display is set as invalid is transmitted to the display device 300. In this embodiment, by having this configuration, it becomes no longer necessary for a user to set the value of the set item related to the switching of the display, thereby improving the operability.

Third Embodiment

Next, a third embodiment of the present invention is described with reference to the accompanying drawings. The third embodiment of the present invention differs from the second embodiment in that the number of the content data 221 included in the playback content data 331 is detected by the display device 300.

Therefore, in the following, only the difference from the second embodiment is described and the same reference numerals are repeatedly used to describe the same or equivalent elements described in the second embodiment and the repeated descriptions thereof may be omitted.

Figure 14:
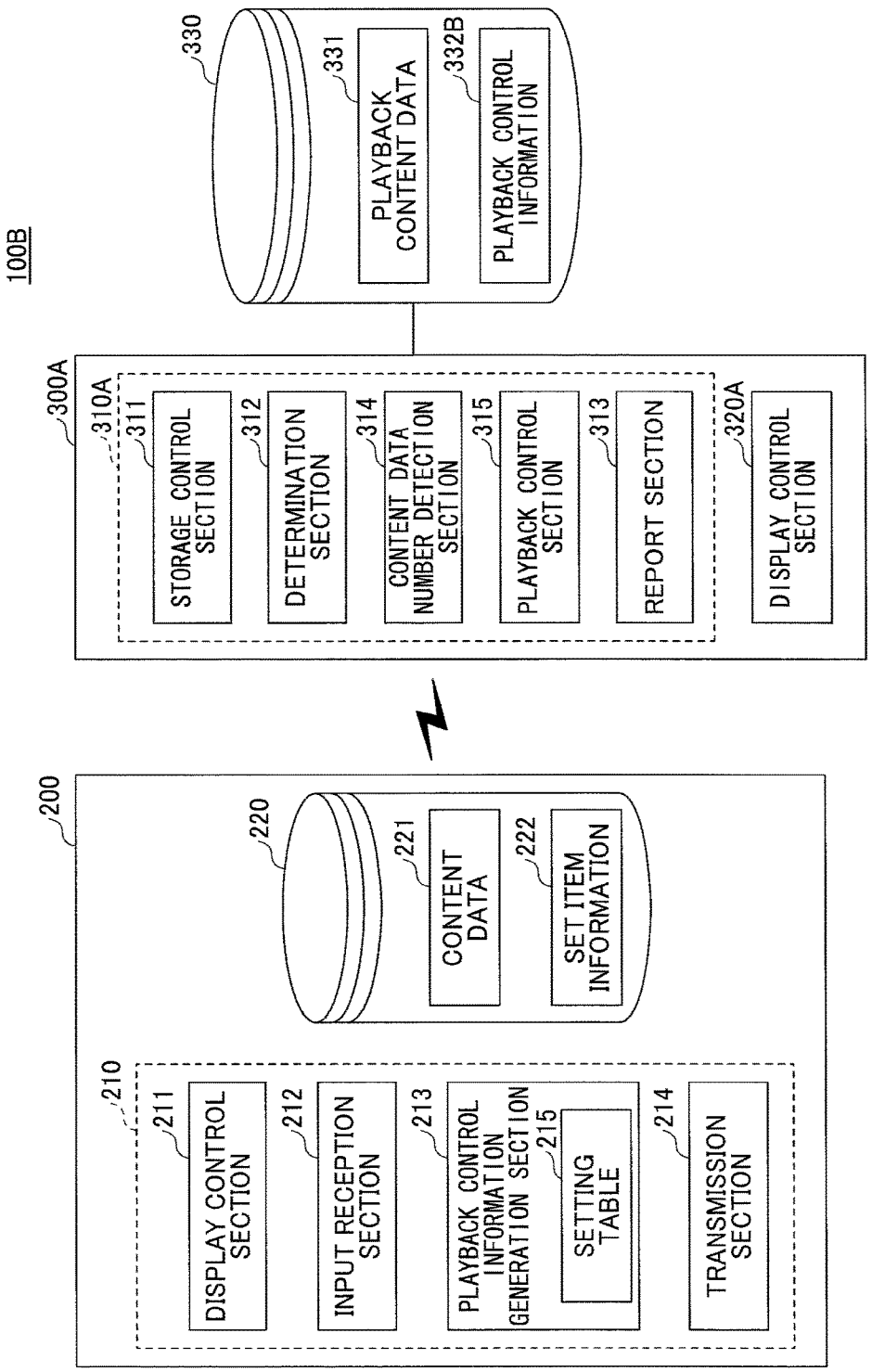
FIG. 14 is an example functional block diagram of apparatuses included in a display system according to a third embodiment.

FIG. 14 illustrates an example functional configuration of the devices in a display system 100B according to the third embodiment.

The display system 100B in this embodiment includes the information terminal 200 and a display device 300A.

The display device 300A in this embodiment includes a playback program 310A installed therein. The display device 300A in this embodiment includes the storage control section 311, the determination section 312, the report section 313, a content data number detection section 314, and a playback control section 315. The display device 300A in this embodiment further includes a display control section 320A.

The content data number detection section 314 detects the number of the content data 221 included in the playback content data 331 transmitted from the information terminal 200.

Depending on whether the detected number of the content data 221 is one or more than one, the playback control section 315 in this embodiment determines whether to execute the playback in accordance with the playback control information 332 received from the information terminal 200.

Specifically, when, for example, it is detected that the number of the content data 221 included in the playback content data 331 is one, the playback control section 315 in this embodiment sets the value of the set item related to the switching of the display as invalid in the playback control information 332 and transmits the playback control information 332 to the display control section 320A.

On the other hand, when, for example, it is detected that the number of the content data 221 included in the playback content data 331 is more than one, the playback control section 315 in this embodiment transmits the playback control information 332B, which is received from the information terminal 200, to the display control section 320A as it is.

The display control section 320A plays back the playback content data 331 based on the playback control information 332B received from the playback control section 315.

As described above, according to this embodiment, the function realized (provided) in the information terminal 200A in the second embodiment is realized in the display device 300A. By doing this, the same effect as that in the second embodiment can be obtained.

FIG. 15 illustrates an example of the playback control information 332B according to the third embodiment. The playback control information 332B of FIG. 15 is generated when "file_1.jpeg" is selected as the playback content data 331 in the list screen of the content data 221 and the value of the set item "Time" in the set item information 222 is set as "10".

In the example of FIG. 15, the playback content data 331 is a single content data 221 (image data). Therefore, the playback control section 315 sets the value of the set item "Time" as an invalid value in the playback control information 332B and transmits the playback control information 332B to the display control section 320.

Specifically, for example, the playback control section 315 may set "0" or "∞" as the value of the set item "Time" in the playback control information 332B and transmit the playback control information 332B to the display control section 320.

Figure 16:
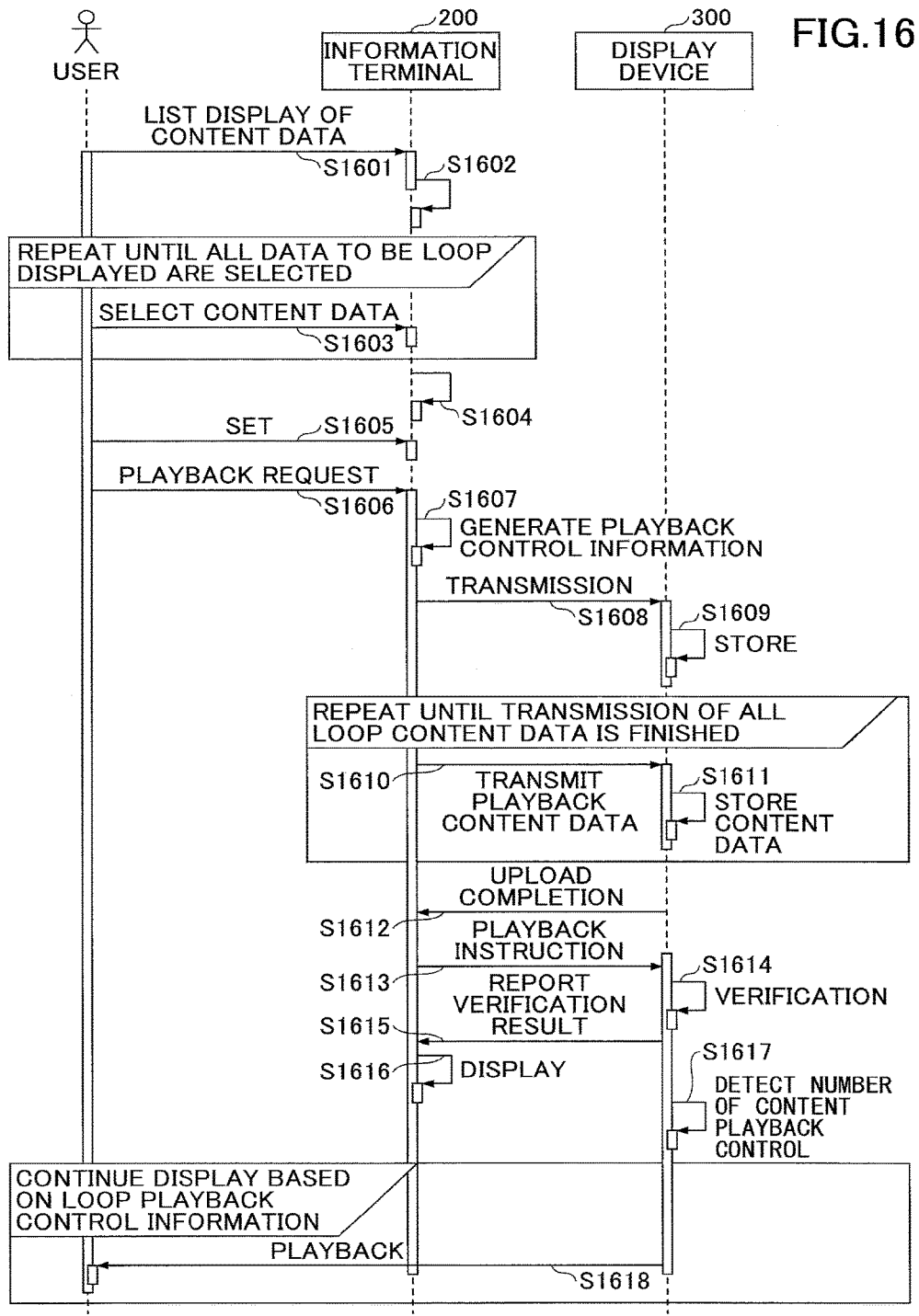
FIG. 16 is an example sequence diagram of an operation of the display system according to the third embodiment.

Next, an example operation of the display system 100B according to this embodiment is described with reference to FIG. 16. FIG. 16 is a sequence diagram of an example operation of the display system 100B according to the third embodiment.

Here, the processes in steps S1601 through 51616 in FIG. 16 are the same as those in steps S801 through S816 in FIG. 8. Therefore, the repeated descriptions thereof are herein omitted.

When the determination section 312 finishes the determination in step S1614, the content data number detection section 314 detects the number of the content data 221 included in the playback content data 331 based on the received playback control information 332B (step S1617).

When the detected number of the content data 221 is one, the playback control section 315 sets an invalid value as the value of the set item related to the display of the playback control information 332B and transmits the playback control information 332B to the display control section 320. The method of setting the value as invalid is described above.

On the other hand, when the detected number of the content data 221 is more than one, the playback control section 315 transmits the playback control information 332, which is received from the information terminal 200, to the display control section 320 as it is.

Here, the process in steps S1618 in FIG. 16 is the same as that in steps S817 in FIG. 8. Therefore, the repeated descriptions thereof are herein omitted.

Further, in this embodiment, a case is described where, when the detected number of the content data 221 included in the playback content data 331 is one, the value of the set item related to the display is set as invalid. However, the present invention is not limited to this setting.

For example, after causing the display control section 320 to display the playback content data 331 based on the value of the set item "Time", the playback control section 315 may terminate the display of the playback content data 331 by the display control section 320.

Further, the playback control section 315 may ignore the value of the set item "Effect" rather than the value of the set item "Time" included in the playback control information 332 as the value of the set item related to the switching of the display. Otherwise, the playback control section 315 may ignore both the value of the set item "Effect" and the value of the set item "Time" included in the playback control information 332 as the value of the set item related to the switching of the display.

Further, the content data number detection section 314 and the playback control section 315 in this embodiment may be included in the display device 300 as a part of the determination section 312. In this case, the processes of the content data number detection section 314 and the playback control section 315 may be executed as a part of the determination (verification) process by the determination section 312.

As described above, according to this embodiment, when the detected number of the content data 221 included in the playback content data 331 is one, the value of the set item related to the switching of the display is set as invalid.

According to this embodiment, by having this configuration, it becomes possible to continue the playback of desired content data 221 without unnecessarily switching (changing) the display of the content data 221. Further, according to this embodiment, by having the configuration described above, it is no longer necessary for a user to further set the value, thereby improving the operability.

Fourth Embodiment

Next, a fourth embodiment of the present invention is described with reference to the accompanying drawings. The fourth embodiment differs from the second embodiment in that the content data 221 are supplied from a content providing server. Therefore, in the following, only the difference from the second embodiment is described and the same reference numerals are repeatedly used to describe the same or equivalent elements described in the second embodiment and the repeated descriptions thereof may be omitted.

Figure 17:
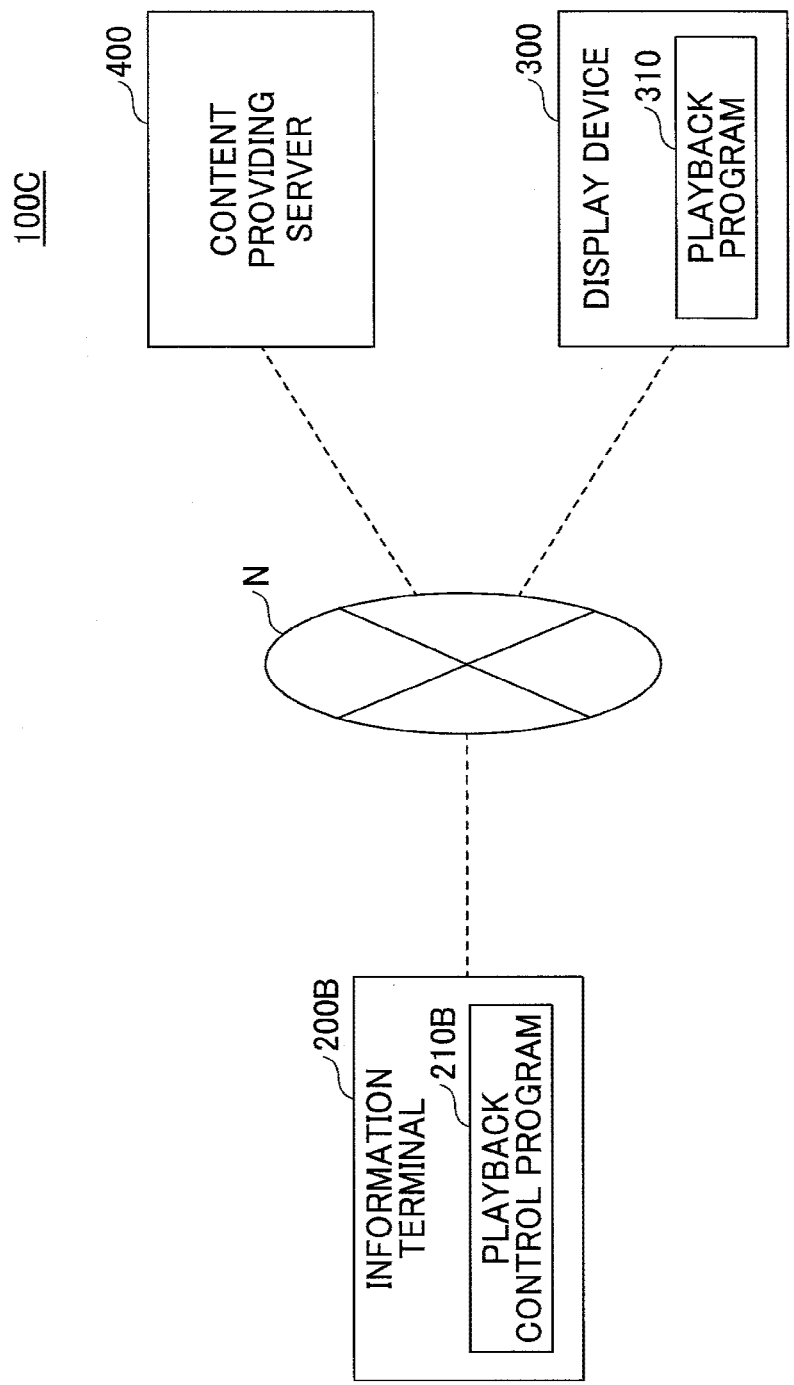
FIG. 17 illustrates an example system configuration of a display system according to a fourth embodiment.

FIG. 17 illustrates an example system configuration of a display system 100C according to the fourth embodiment.

The display system 100C in this embodiment includes an information terminal 200B, the display device 300, and a content providing server 400.

The information terminal 200B in this embodiment includes a playback control program 210B installed therein. The information terminal 200B executes the playback control program 210B to allow a user to select the content data 221, which are to be played back on the display device 300, from the content providing server 400. The information terminal 200B in this embodiment generates the playback control information 332A of the selected playback content data 331 and transmits the generated playback control information 332A to the display device 300.

The content providing server 400 in this embodiment is present on a network, so as to provide the content data 221 in response to an acquisition request for acquiring the content data 221.

Namely, in the display system 100C in this embodiment, the playback content data 331 are provided from the content providing server 400 to the display device 300. Therefore, in this embodiment, the information that is transmitted from the information terminal 200B to the display device 300 is the playback control information 332A only.

Due to this configuration, it becomes possible to reduce the communication time in the communications between the information terminal 200B and the display device 300. Accordingly, it becomes possible for a user to set the playback method (manner) of the desired playback content data 331 in a shorter time period.

Figure 18:
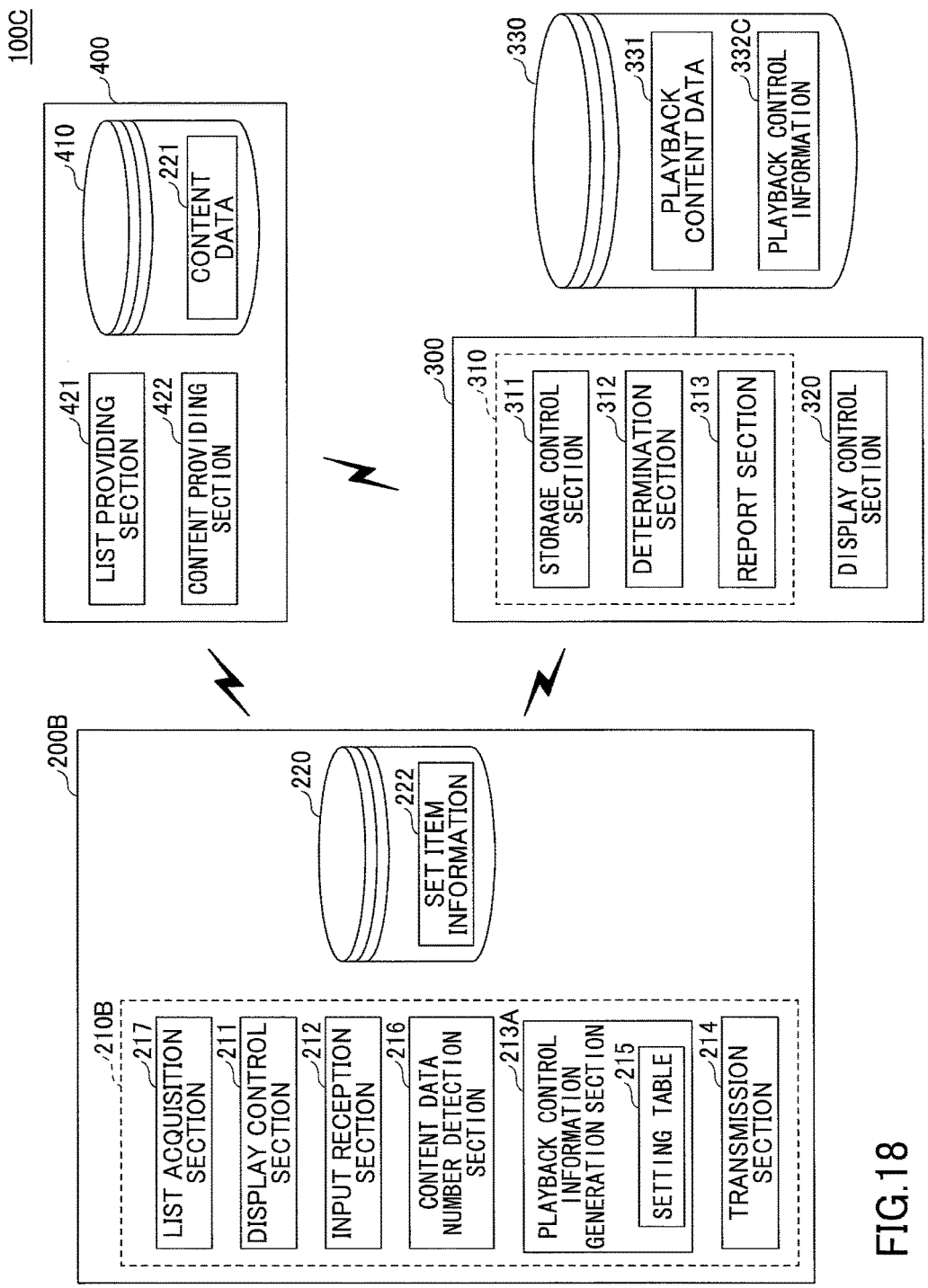
FIG. 18 is an example functional block diagram of apparatuses included in the display system according to the fourth embodiment.

FIG. 18 illustrates an example functional configuration of the devices in the display system 100C according to the fourth embodiment.

The information terminal 200B in this embodiment includes the elements that are included in the information terminal 200B in the second embodiment and a list acquisition section 217.

The information terminal 200B in this embodiment does not include the content data 221 to be selected in the storage area 220 and does include only the set item information 222. Upon receiving the acquisition request for acquiring a list of the content data 221 from a user, the list acquisition section 217 acquires the list of the content data 221 stored in the content providing server 400.

Based on the list acquired by the list acquisition section 217, the display control section 211 in this embodiment controls to display a list screen. Further, when the content data 221 to be played back in the list screen is selected, the playback control information generation section 213A in this embodiment acquires the information indicating the stored location (i.e., the value of the set item "Path") of the selected content data 221 from the content providing server 400.

Further, the playback control information generation section 213 stores the value of the set item "Path", which is acquired from the content providing server 400, into the setting table 215, and generates playback control information 332C. Details of the playback control information 332C are described below.

Further, the playback control information generation section 213A in this embodiment generates the playback control information 332C based on whether the number of the selected content data 221 is more than one. Namely, when the number of the selected content data 221 is one, the playback control information generation section 213A in this embodiment generates the playback control information 332C in which the value of the set item related to the switching of the display is set as invalid.

The content providing server 400 in this embodiment is realized by a general-purpose computer in including, for example, a CPU and a memory section.

The content providing server 400 in this embodiment includes a predetermined storage area 410 formed in the memory section and stores the content data 221 in the storage area 410.

The content providing server 400 in this embodiment further includes a list providing section 421 and a content providing section 422. Upon the receipt of the acquisition request for acquiring the list of the content data 221 stored in the storage area 410 from the information terminal 200B, the list providing section 421 in this embodiment provides (transmits) the list of the content data 221 to the information terminal 200B.

The content providing section 422 provides (transmits) the content data 221, which are selected in the list of the content data 221 provided by the list providing section 421, to the display device 300 as the playback content data 331.

Next, the playback control information 332C is described. FIG. 19 illustrates an example playback control information 332C according to the fourth embodiment.

The playback control information 332C of FIG. 19 is generated when "file_1.jpeg" is selected as the playback content data 331 and the value of the set item "Time" in the set item information 222 is set to "10". Further, in the playback control information 332C, the value of the set item "Path" in the content data 221 included in the playback content data 331 denotes the information indicating the stored location of the content data 221 in the content providing server 400.

Next, an example operation of the display system 100C according to this embodiment is described with reference to FIG. 20. FIG. 20 is a sequence diagram of an example operation of the display system 100C according to the fourth embodiment.

In the display system 100C according to this embodiment, a user requests the information terminal 200B to display the list of the content data 221 (step S2001). Then, the information terminal 200B sends an acquisition request for acquiring the list of the content data 221 to the content providing server 400, so that the list acquisition section 217 acquires the list of the content data 221 (step S2002).

Here, the processes in steps S2003 through S2011 in FIG. 20 are the same as those in steps S1302 through S1310 in FIG. 13. Therefore, the repeated descriptions thereof are herein omitted.

In step S2013, when the playback control information 332C is stored in the storage area 330, the report section 313 of the display device 300 notifies the information terminal 200B of the completion of the transmission of the playback control information 332C (step S2012).

Here, the processes in steps S2013 through S2015 in FIG. 20 are the same as those in steps S1314 through S1316 in FIG. 13. Therefore, the repeated descriptions thereof are herein omitted.

After notifying the information terminal 200B of the determination (verification) result in step S2015, the storage control section 311 of the display device 300 sends an acquisition request for acquiring the playback content data 331 to the content providing server 400 (step S2016), and acquires the playback content data 331.

Then, the storage control section 311 display control section 320 stores the acquired playback content data 331 into the storage area 330 (step S2017). Then, the display control section 320 of the display control section 320 plays back the playback content data 331 based on the playback control information 332C (step S2018).

As described above, according to this embodiment, even when, for example, the content data 221 are stored in an external device (i.e., outside of the information terminal 200B), it becomes possible to play back the playback content data 331 selected by a user on the display device 300 in a user's desired manner.

In this embodiment, a case is described where the display device 300 acquires the playback content data 331. However, the present invention is not limited to this configuration. For example, the display device 300 may have a browser so as to refer to the playback content data 331 on the content providing server 400 and play back the playback content data 331 based on the playback control information 332C.

Further, in this embodiment, a case is described where the information terminal 200B transmits the playback control information 332C to the display device 300. However, the present invention is not limited to this configuration. The information terminal 200B may upload the playback control information 332C on a network and transmit the information indicating the uploaded destination to the display device 300.

As the information indicating the uploaded destination, for example, the Uniform Resource Locator (URL) may be used. In this case, the display device 300 may download the playback control information 332C based on the information indicating the uploaded destination. Further, the display device 300 may refer to the playback control information 332C stored in a server based on the information indicating the uploaded destination and play back the playback content data 331.

Further, in this embodiment, a case is described where as the display system 100C according to the fourth embodiment the display system 100A according to the second embodiment is combined with the content providing server 400. However, the present invention is not limited to the configuration including the content providing server 400. For example, the content providing server 400 may be combined with the display system according to the first embodiment or the third embodiment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display system, comprising:
   a display; and
   an information terminal able to communicate with the display,
   wherein the information terminal includes
      first processing circuitry configured to receive a number of content data selected by a user and corresponding user-input setting information for each of the selected content data, the setting information being used to control how the selected content data is to be played back, determine the number of content data selected by the user, and generate playback control information based on the determined number of the selected content data, the playback control information being used for controlling playback of the selected content data and including version information and information indicating a storage location of the selected content data, and
      a transmitter configured to transmit the playback control information to the display,
   wherein the display includes second processing circuitry configured to control the playback of the selected content data based on the playback control information by referring to the version information and the information indicating the storage location of the selected content data included in the playback control information transmitted from the transmitter of the information terminal, the version information being used by the second processing circuitry to determine whether the selected content data can be played back or not, and wherein the first processing circuitry is further configured to generate the playback control information, by determining whether the determined number of the selected content data is more than one, only when determining that the determined number is not more than one, set an item in the playback control information to a value to cause display of the content data to not be switched, regardless of any user input for the item, and when determining that the determined number is more than one, set the item in the playback control information based on the user-input setting information.

2. A display configured to communicate with an information terminal and configured to play back content data, comprising:

a receiver configured to receive playback control information generated by the information terminal, the playback control information being used for controlling playback of the content data and including version information and information indicating a storage location of the content data; and processing circuitry configured to determine whether the content data can be played back or not based on the version information;

determine a number of content data to be played back by analyzing the playback control information;

change a value of a predetermined item which controls playback of the content data and is included in the playback control information, when determining that the determined number of content data to be played back is not more than one, and in response to an instruction from the information terminal to play back the content data, select one of the playback control information received by the receiver in which the value of the predetermined item has been changed because the determined number of content data to be played back is not more than one, and play back the content data based on the selected playback control information.

3. The display according to claim 2, wherein the predetermined item refers to an item related to switching of display of the content data, and wherein the processing circuitry is configured to determine whether the determined number of the content data is more than one, and, when determining that the determined number of the content data is not more than one, set a first predetermined value as the value of the item related to the switching of the display of the content data.

4. The display according to claim 3, wherein the item related to the switching of the display of the content data includes an item indicating playback time period of the content data, and wherein the processing circuitry is configured to set a value "0" or "∞" as the value of the item indicating playback time period of the content data.

5. The display according to claim 4, wherein the item related to the switching of the display of the content data includes an item indicating a method of the switching of the display of the content data, and wherein the processing circuitry is configured to set a second predetermined value as the value of the item indicating the method of the switching of the display of the content data.

6. The display of claim 3, wherein the processing circuitry is further configured to set the first predetermined value to zero when determining that the determined number of the content data is not more than one.

7. The display of claim 2, wherein the processing circuitry is further configured to determine, from the playback control information, whether the determined number of the selected content data is more than one, and when determining that the determined number is not more than one, set flail the value of the predetermined item in the playback control information to cause display of the content data to not be switched.

8. A non-transitory recording medium storing a computer-readable program causing an information terminal able to communicate with a display to execute a playback control method comprising:

receiving a number of content data selected by a user and corresponding user-input setting information for each of the selected content data, the setting information being used to control how the selected content data is to be played back, determining the number of content data selected by the user;

generating playback control information based on the determined number of the selected content data, the playback control information being used for controlling the playback of the selected content data and including version information and information indicating a storage location of the selected content data; and transmitting the playback control information to the display, wherein the generating step includes determining whether the selected content data can be played back or not based on the version information;

determining whether the determined number of the content data is more than one, only when determining that the determined number of the content data is not more than one, setting a value of an item in the playback control information related to the switching of the display of the content data regardless of any user input for the item, and when determining that the determined number is more than one, setting the item in the playback control information based on the user-input setting information.

9. The non-transitory recording medium according to claim 8, wherein the item related to the switching of the display of the content data includes an item indicating a playback time period of the content data, and wherein, in the generating, a value "0" or "∞" is set as the value of the item indicating the playback time period of the content data.

10. The non-transitory recording medium according to claim 9, wherein the item related to the switching of the display of the content data includes an item indicating a method of the switching of the display of the content data, and wherein, in the generating, a second value is set as the value of the item indicating the method of the switching of the display of the content data.

\* \* \* \* \*